United States Patent
Li

(10) Patent No.: US 10,574,728 B2
(45) Date of Patent: Feb. 25, 2020

(54) USER PAIRING METHOD AND APPARATUS, AND DATA EXCHANGE METHOD, APPARATUS, AND SYSTEM

(71) Applicant: Tencent Technology (Shenzhen) Company Limited, Shenzhen (CN)

(72) Inventor: Jianli Li, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 784 days.

(21) Appl. No.: 15/061,625

(22) Filed: Mar. 4, 2016

(65) Prior Publication Data

US 2016/0191610 A1 Jun. 30, 2016

Related U.S. Application Data

(63) Continuation of application No. PCT/CN2014/089638, filed on Oct. 28, 2014.

(30) Foreign Application Priority Data

Oct. 28, 2013 (CN) .......................... 2013 1 0515772

(51) Int. Cl.
*H04L 29/08* (2006.01)
*H04W 4/029* (2018.01)
(Continued)

(52) U.S. Cl.
CPC .............. *H04L 67/06* (2013.01); *G01P 15/00* (2013.01); *H04W 4/029* (2018.02); *H04W 56/0015* (2013.01)

(58) Field of Classification Search
CPC ......... G06F 17/30011; G06F 17/30014; G06F 17/30058; G06F 17/30023; G06F 17/30;
(Continued)

(56) References Cited

U.S. PATENT DOCUMENTS 7,739,076 B1 * 6/2010 Vock .................. A63B 24/0062
702/182
2010/0184563 A1 * 7/2010 Molyneux ............ A43B 1/0054
482/1

(Continued)

FOREIGN PATENT DOCUMENTS

CN 102710858 A 10/2012
CN 102752710 A 10/2012
(Continued)

OTHER PUBLICATIONS

Office Action dated Mar. 23, 2017 for Chinese Application No. 201310515772.4, 8 pages.
(Continued)

*Primary Examiner* — Mahran Y Abu Roumi
(74) *Attorney, Agent, or Firm* — Brinks Gilson & Lione

(57) ABSTRACT

A user pairing method and apparatus, and a data exchange method, apparatus, and system are provided. In the data exchange method, a server receives geographic location identification information and acceleration sample information sent by electronic terminals. The server determines whether geographic locations of the electronic terminals satisfy a predetermined condition. The server determines according to an acceleration value and time corresponding to the acceleration value, whether the acceleration sample information of the first electronic terminal and the acceleration sample information of the second electronic terminal are matched. If the geographic location of the first electronic terminal and the geographic location of the second electronic terminal satisfy the predetermined condition and the acceleration sample information of the first electronic terminal and the acceleration sample information of the second electronic terminal are matched, sending first to-be-ex-
(Continued)

changed data associated with the second electronic terminal to the first electronic terminal.

10 Claims, 24 Drawing Sheets

(51) Int. Cl.
*G01P 15/00* (2006.01)
*H04W 56/00* (2009.01)

(58) Field of Classification Search
CPC ......... G06F 17/30017; G06F 17/30194; G06F 17/30386; G06F 17/30575; G06F 17/30283; G06T 11/60; G06T 5/50; G06T 2207/20212; G06T 3/4038; G06T 15/503; G06T 2207/20221; G09G 5/377; G09G 2340/12; G09G 2340/10; H04N 5/23238; H04N 13/158
USPC ........................................................ 709/217
See application file for complete search history.

(56) References Cited

U.S. PATENT DOCUMENTS

| | | | | |
|---|---|---|---|---|
| 2011/0119058 A1* | 5/2011 | Berard | ................ | G11B 27/034 |
| | | | | 704/235 |
| 2011/0152695 A1* | 6/2011 | Granqvist | ............ | A61B 5/0006 |
| | | | | 600/481 |
| 2012/0212505 A1* | 8/2012 | Burroughs | .......... | G06F 19/3481 |
| | | | | 345/629 |
| 2015/0120553 A1* | 4/2015 | Li | ..................... | H04M 1/72522 |
| | | | | 705/44 |

FOREIGN PATENT DOCUMENTS

| | | |
|---|---|---|
| CN | 102902472 A | 1/2013 |
| CN | 103313347 A | 9/2013 |

OTHER PUBLICATIONS

ISR and Written Opinion to PCT/CN2014/089638, dated Jan. 21, 2015, 13p.

* cited by examiner

USER PAIRING METHOD AND APPARATUS, AND DATA EXCHANGE METHOD, APPARATUS, AND SYSTEM

CROSS-REFERENCE TO RELATED APPLICATIONS

This application is a continuation of International Application No. PCT/CN2014/089638, filed Oct. 28, 2014, which claims priority to Chinese Patent Application No. 201310515772.4, filed on Oct. 28, 2013, both of which are hereby incorporated by reference in their entirety.

FIELD

The present disclosure relates to a data exchange technology, and in particular, to a user pairing method and apparatus, and a data exchange method, apparatus, and system based on the user pairing method.

BACKGROUND

Near field payment refers to that when a consumer purchases a commodity or service, payment to a vendor is performed by using a mobile phone instantly, payment processing is performed on site, and local communication with a vending machine and a point of sale (POS) machine is implemented offline by using a channel such as mobile phone radio frequency (NFC), infrared or Bluetooth.

In conventional near field payment, generally hardware of a mobile phone needs to be reconstructed or a hardware accessory needs to be added. Because of varied technical standards, it is very difficult to spread related hardware devices and payment solutions relying on such hardware devices in a short period of time. Under this background, innovative payment solutions where near field information is exchanged with the help of emerging technologies such as two-dimensional code (barcode) scanning, acoustic wave modulation, and mobile phone geographic location information, and then payment is completed by using a mature online payment technology are put forward one by one. These solutions are commonly characterized in that payment is performed in a near field, and does not depend on any special hardware device.

The technical principle of two-dimensional code (barcode) payment is that one party of a transaction compiles information into a two-dimensional or one-dimensional pattern according to different barcode standards, and the other party performs scanning by using a camera on a mobile phone and then restores from the pattern the information hidden in the pattern, thereby completing information exchange between both the parties of the transaction.

In acoustic wave payment, an essential microphone and earphone on a mobile phone are used. A transaction number or other key information related to a transaction is modulated through audio and then played by using a microphone on a mobile phone, and another mobile phone approaches the mobile phone that sends out the sound, records the sound by using an earphone, then may restore the information modulated into the sound by decoding the recorded sound, and then may perform payment according to the related information.

Payment based on geographic location information is typically "shake" payment. The current practice of the "shake" payment is that, when a user shakes a mobile phone, the mobile phone uploads its own geographic location information to a backend server; when finding that multiple persons shake mobile phones at a same location, the backend server recommends another person to the user, and the user may select a nearby person who is currently shaking a mobile phone to perform a transaction.

However, all the above solutions have some disadvantages. The two-dimensional code (barcode) payment depends on the widespread of two-dimensional code identifiers of commodities and construction of a barcode database, the acoustic wave payment requires a relatively quiet transaction site, the conventional "shake" payment is not intelligent enough that if multiple persons are all shaking mobile phones in a near field, a transaction object needs to be manually selected from multiple possible transaction objects, resulting in low efficiency and easy occurrence of errors.

SUMMARY

In view of this, it is necessary to provide a user pairing method and apparatus, and a data exchange method, apparatus, and system, which can improve efficiency of user pairing and efficiency of subsequent data processing in a near field payment environment.

In a first aspect, a user pairing method includes: receiving geographic location identification information and acceleration sample information sent by each of a first electronic terminal and a second electronic terminal, where the acceleration sample information includes at least one sample, and each sample includes time and an acceleration value; determining, according to the geographic location identification information, whether a geographic location of the first electronic terminal and a geographic location of the second electronic terminal satisfy a predetermined condition; determining, according to the acceleration value and the time corresponding to the acceleration value, whether the acceleration sample information of the first electronic terminal and the acceleration sample information of the second electronic terminal are matched; and if the geographic location of the first electronic terminal and the geographic location of the second electronic terminal satisfy the predetermined condition and the acceleration sample information of the first electronic terminal and the acceleration sample information of the second electronic terminal are matched, recording a pairing relationship between a first user and a second user which are associated with the first electronic terminal and the second electronic terminal respectively.

In a second aspect, a data exchange method between electronic terminals is implemented in a server. The method includes: receiving geographic location identification information and acceleration sample information sent by each of a first electronic terminal and a second electronic terminal, where the acceleration sample information includes at least one sample, and each sample includes time and an acceleration value; determining, according to the geographic location identification information, whether a geographic location of the first electronic terminal and a geographic location of the second electronic terminal satisfy a predetermined condition; determining, according to the acceleration value and the time corresponding to the acceleration value, whether the acceleration sample information of the first electronic terminal and the acceleration sample information of the second electronic terminal are matched; and if the geographic location of the first electronic terminal and the geographic location of the second electronic terminal satisfy the predetermined condition and the acceleration sample information of the first electronic terminal and the acceleration sample information of the second electronic terminal are matched, exchange data between the first electronic terminal and the second electronic terminal. The data exchange may include: sending first to-be-exchanged data associated with the second electronic terminal to the first electronic terminal, and/or sending second to-be-exchanged data associated with the first electronic terminal to the second electronic terminal.

In a third aspect, a data exchange method between electronic terminals is implemented in a first electronic terminal. The method includes: collecting geographic location identification information and acceleration sample information of the first electronic terminal, and sending the collected information to a server, so that the server obtains, according to the geographic location identification information and the acceleration sample information, a second electronic terminal matched with the first electronic terminal; receiving first to-be-exchanged data returned by the server and associated with the second electronic terminal; generating a data processing request according to the first to-be-exchanged data; and sending the data processing request to the server, so that the server completes data processing according to the data processing request and sends a processing result to the second electronic terminal.

In a forth aspect, a data exchange method between electronic terminals includes: collecting, by each of a first electronic terminal and a second electronic terminal, geographic location identification information and acceleration sample information, and sending the collected information to a server, where the acceleration sample information includes at least one sample, and each sample includes time and an acceleration value; and determining, by the server according to the geographic location identification information, whether a geographic location of the first electronic terminal and a geographic location of the second electronic terminal satisfy a predetermined condition; determining, according to the acceleration value and the time corresponding to the acceleration value, whether the acceleration sample information of the first electronic terminal and the acceleration sample information of the second electronic terminal are matched; and if the geographic location of the first electronic terminal and the geographic location of the second electronic terminal satisfy the predetermined condition and the acceleration sample information of the first electronic terminal and the acceleration sample information of the second electronic terminal are matched, exchange data between the first electronic terminal and the second electronic terminal. The data exchange may include: sending first to-be-exchanged data associated with the second electronic terminal to the first electronic terminal, and/or sending second to-be-exchanged data associated with the first electronic terminal to the second electronic terminal.

In a fifth aspect, a user pairing apparatus includes a hardware processor and a non-transitory storage medium accessible to the hardware processor. The non-transitory storage medium is configured to store modules including: a receiving module, a geographic location module, an acceleration module, and a pairing module. The receiving module is programmed to receive geographic location identification information and acceleration sample information sent by each of a first electronic terminal and a second electronic terminal, where the acceleration sample information includes at least one sample, and each sample includes time and an acceleration value. The geographic location module is programmed to determine, according to the geographic location identification information, whether a geographic location of the first electronic terminal and a geographic location of the second electronic terminal satisfy a predetermined condition. The acceleration module is programmed to determine, according to the time and the acceleration value, whether the acceleration sample information of the first electronic terminal and the acceleration sample information of the second electronic terminal are matched. The pairing module is programmed to: if the geographic location of the first electronic terminal and the geographic location of the second electronic terminal satisfy the predetermined condition and the acceleration sample information of the first electronic terminal and the acceleration sample information of the second electronic terminal are matched, record a pairing relationship between a first user and a second user which are associated with the first electronic terminal and the second electronic terminal respectively.

An apparatus for data exchange between electronic terminals is implemented in a server. The apparatus includes a hardware processor and a non-transitory storage medium accessible to the hardware processor. The non-transitory storage medium is configured to store modules including: a receiving module, a geographic location module, an acceleration module, and a data exchange module. The receiving module is programmed to receive geographic location identification information and acceleration sample information sent by each of a first electronic terminal and a second electronic terminal, where the acceleration sample information includes at least one sample, and each sample includes time and an acceleration value. The geographic location module is programmed to determine, according to the geographic location identification information, whether a geographic location of the first electronic terminal and a geographic location of the second electronic terminal satisfy a predetermined condition. The acceleration module is programmed to determine, according to the acceleration value and the time corresponding to the acceleration value, whether the acceleration sample information of the first electronic terminal and the acceleration sample information of the second electronic terminal are matched. The data exchange module is programmed to: if the geographic location of the first electronic terminal and the geographic location of the second electronic terminal satisfy the predetermined condition and the acceleration sample information of the first electronic terminal and the acceleration sample information of the second electronic terminal are matched, exchange data between the first electronic terminal and the second electronic terminal. The data exchange may include: sending first to-be-exchanged data associated with the second electronic terminal to the first electronic terminal, and/or sending second to-be-exchanged data associated with the first electronic terminal to the second electronic terminal.

An apparatus for data exchange between electronic terminals is implemented in a first electronic terminal. The apparatus includes a hardware processor and a non-transitory storage medium accessible to the hardware processor. The non-transitory storage medium is configured to store modules including: a collecting module, a receiving module, a request generating module, and a sending module. The collecting module is programmed to collect geographic location identification information and acceleration sample information of the first electronic terminal, and sending the collected information to a server, so that the server obtains, according to the geographic location identification information and the acceleration sample information, a second electronic terminal matched with the first electronic terminal. The receiving module is programmed to receive first to-be-exchanged data returned by the server and associated with the second electronic terminal. The request generating module is programmed to generate a data processing request according to the first to-be-exchanged data. The sending module is programmed to send the data processing request to the server, so that the server completes data processing according to the data processing request and sends a processing result to the second electronic terminal.

A data exchange system between electronic terminals includes: a first electronic terminal, a second electronic terminal, and a server. Either of the first electronic terminal and the second electronic terminal is programmed to collect geographic location identification information and acceleration sample information, and sending the collected information to a server, where the acceleration sample information includes at least one sample, and each sample includes time and an acceleration value. The server is programmed to determine, according to the geographic location identification information, whether a geographic location of the first electronic terminal and a geographic location of the second electronic terminal satisfy a predetermined condition; determining, according to the acceleration value and the time corresponding to the acceleration value, whether the acceleration sample information of the first electronic terminal and the acceleration sample information of the second electronic terminal are matched; and if the geographic location of the first electronic terminal and the geographic location of the second electronic terminal satisfy the predetermined condition and the acceleration sample information of the first electronic terminal and the acceleration sample information of the second electronic terminal are matched, sending first to-be-exchanged data associated with the second electronic terminal to the first electronic terminal, and/or sending second to-be-exchanged data associated with the first electronic terminal to the second electronic terminal.

In the technical solutions, electronic terminals at a same place (or in a range) are obtained through sifting by using geographic locations, and then two electronic terminals which are currently contacting each other are decided by comparing modes of acceleration sample information collected by different electronic terminals in a same time range, so that data can be exchanged rapidly between the two electronic terminals, input operations of a user can be reduced, and efficiency of data exchange and data processing can be improved.

In order to make the aforementioned objectives, features, and advantages of the present disclosure more comprehensible, example embodiments are further described in detail hereinafter with reference to the accompanying drawings.

BRIEF DESCRIPTION OF THE DRAWINGS

The disclosure will become more fully understood from the detailed description given herein below for illustration only, and thus are not limitative of the disclosure, and wherein.

DETAILED DESCRIPTION OF THE DRAWINGS

Figure 1:
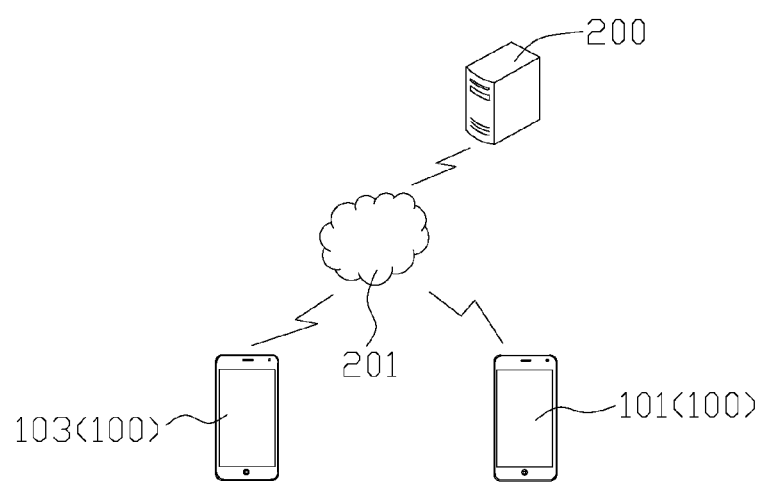
FIG. 1 is a schematic architectural diagram of a data exchange system according to a first embodiment of the present disclosure.

Reference throughout this specification to "one embodiment," "an embodiment," "example embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an example embodiment," or the like in the singular or plural in various places throughout this specification are not necessarily all referring to the same embodiment. Furthermore, the particular features, structures, or characteristics may be combined in any suitable manner in one or more embodiments.

The terminology used in the description of the disclosure herein is for the purpose of describing particular examples only and is not intended to be limiting of the disclosure. As used in the description of the disclosure and the appended claims, the singular forms "a," "an," and "the" are intended to include the plural forms as well, unless the context clearly indicates otherwise. Also, as used in the description herein and throughout the claims that follow, the meaning of "in" includes "in" and "on" unless the context clearly dictates otherwise. It will also be understood that the term "and/or" as used herein refers to and encompasses any and all possible combinations of one or more of the associated listed items. It will be further understood that the terms "may include," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "module" or "unit" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module or unit may include memory (shared, dedicated, or group) that stores code executed by the processor.

The exemplary environment may include a server, a client, and a communication network. The server and the client may be coupled through the communication network for information exchange, such as sending/receiving identification information, sending/receiving data files such as splash screen images, etc. Although only one client and one server are displayed in the environment, any number of terminals or servers may be included, and other devices may also be included.

The communication network may include any appropriate type of communication network for providing network connections to the server and client or among multiple servers or clients. For example, communication network may include the Internet or other types of computer networks or telecommunication networks, either wired or wireless. In a certain embodiment, the disclosed methods and apparatus may be implemented, for example, in a wireless network that includes at least one client.

In some cases, the client may refer to any appropriate user terminal with certain computing capabilities, such as a personal computer (PC), a work station computer, a server computer, a hand-held computing device (tablet), a smart phone or mobile phone, or any other user-side computing device. In various embodiments, the client may include a network access device. The client may be stationary or mobile.

A server, as used herein, may refer to one or more server computers configured to provide certain server functionalities, such as database management and search engines. A server may also include one or more processors to execute computer programs in parallel.

A user, as used herein, may refer to one or more persons or things that control a client. The user may control more than one client or other devices.

To further set forth the technical means taken in the present disclosure for achieving the predetermined inventive objective and the efficacy, specific implementation manners, structures, features, and efficacy thereof according to the present disclosure are described in detail below with reference to the accompanying drawings and exemplary embodiments as follows.

Embodiments of the present disclosure relate to a user pairing method, and a data exchange method, apparatus, and system between different electronic terminals.

First Embodiment

FIG. 1 is a schematic architectural diagram of a data exchange system according to a first embodiment of the present disclosure. As shown in FIG. 1, the data exchange system may include a server 200 and multiple electronic terminals 100. The electronic terminals 100 may be various mobile electronic apparatuses such as a smart phone and a tablet computer.

In the example shown in FIG. 1, the multiple electronic terminals 100 include a first electronic terminal 101 and a second electronic terminal 103. The first electronic terminal 101 and the second electronic terminal 103 may communicate with the server 200 through a first network 201. The first network 201 may be, for example, the Internet or a mobile communications network.

Figure 2:
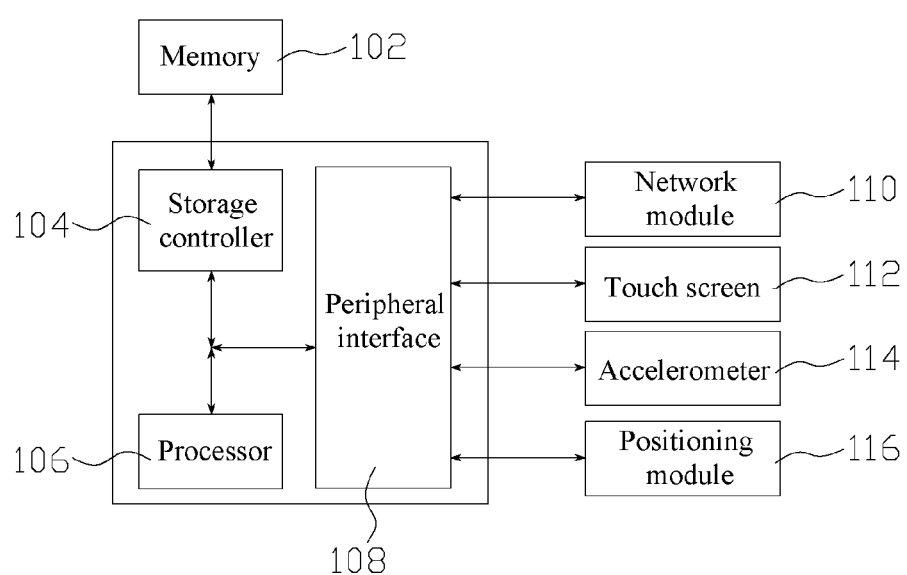
FIG. 2 is a structural block diagram of an electronic terminal in FIG. 1.

FIG. 2 is a structural block diagram of an embodiment of an electronic terminal 100. As shown in FIG. 2, the electronic terminal 100 includes a memory 102, a storage controller 104, one or more (only one is shown) processors 106, a peripheral interface 108, a network module 110, a touch screen 112, an accelerometer 114, and a positioning module 116. It can be understood that, the structure shown in FIG. 2 is only illustrative, and the electronic terminal 100 may further include more or less components than those shown in FIG. 2, or has a configuration different from that shown in FIG. 2. The components shown in FIG. 2 may be implemented by using hardware, software or a combination thereof.

The memory 102 may be configured to store a software program and a module, such as a program instruction/module of a data exchange method in an embodiment of the present disclosure, and the processor 106 executes various function applications and data processing by running the software program and the module stored in the memory 102, that is, implement the data exchange method.

The memory 102 may include a high-speed random memory, and may further include a non-volatile memory, such as one or more magnetic storage apparatuses, a flash memory or another non-volatile solid-state memory. In some examples, the memory 102 may further include memories remotely disposed relative to the processor 106, and these remote memories may be connected to the electronic terminal 100 through a network. Examples of the network include, but are not limited to, the Internet, an enterprise intranet, a local area network, a mobile communications network, and a combination thereof. Access of the processor 106 and other possible components to the memory 102 may be performed under the control of the storage controller 104.

Various input/output apparatuses are coupled to the processor 106 through the peripheral interface 108. The processor 106 runs various software in the memory 102 to instruct the electronic terminal 100 to execute various functions and perform data processing. In some embodiments, the peripheral interface 108, the processor 106, and the storage controller 104 may be implemented in a single chip, and in some other examples, may each be implemented by an independent chip.

The network module 110 is programmed to receive/transmitting a network signal, and specifically, the network module 110 may be a network interface card, programmed to receive/transmitting a local area network signal; or may be a radio frequency module/WIFI module, programmed to receive/transmitting a mobile communications network signal or wireless local area network signal.

The touch screen 112 provides both an output interface and an input interface between the electronic terminal 100 and a user. Specifically, the touch screen 112 displays visualized outputs to the user, and content of these visualized outputs may include text, a pattern, a video, and any combination thereof. Some output results correspond to some user interface objects. The touch screen 112 further receives inputs of users, for example, gesture operations such as taps and slides of the users for a user interface object to respond to the inputs of these users. A technology for detecting an input of a user may be a resistive or capacitive touch detection technology or any other possible touch detection technologies. A specific example of a display unit of the touch screen 112 includes, but is not limited to, a liquid crystal display or light-emitting polymer display. It can be understood that, the touch screen is not essential. For example, an ordinary display screen may be further used, and the input apparatus may be replaced with a keyboard.

The accelerometer 114 is programmed to detect and outputting a current acceleration value of the electronic terminal 100, may generally detect the magnitude of an acceleration in each direction (generally triaxial directions), and may detect the magnitude and the direction of the gravity when the electronic terminal 100 is motionless.

The positioning module 116 is programmed to receive a positioning signal (for example, a Global Positioning System (GPS) signal) broadcasted by satellites, and calculating its own location according to the positioning signal. The location may be, for example, denoted by using a longitude, a latitude, and an altitude. Moreover, a manner of implementing positioning is not limited to using a GPS system. For example, other available satellite positioning systems further include the Beidou satellite positioning system (Compass Navigation Satellite System, CNSS) and a Global Navigation Satellite System (GLONASS). Moreover, positioning is not limited to using a satellite positioning technology. For example, a wireless positioning technology may be further used, such as a positioning technology based on a wireless base station or a wireless hotspot positioning technology. In this case, the positioning module 116 may be replaced with a corresponding module or is directly implemented by the processor 106 executing a specific positioning program.

The data exchange system of this embodiment is described below with reference to a second embodiment.

Second Embodiment

Figure 3:
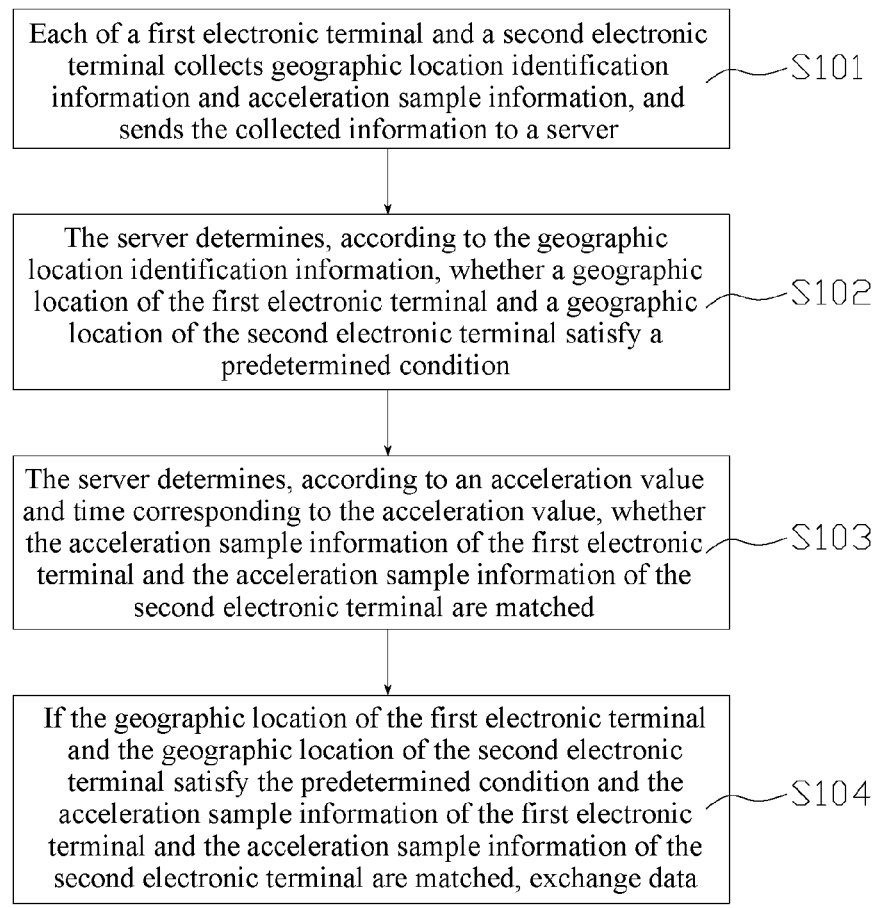
FIG. 3 is a flowchart of a data exchange method according to a second embodiment of the present disclosure.

The second embodiment provides a data exchange method between electronic terminals. FIG. 3 is a flowchart of the method. Referring to FIG. 3, the method of this embodiment includes the following steps:

Step S101: Each of a first electronic terminal and a second electronic terminal collects geographic location identification information and acceleration sample information, and sends the collected information to a server.

Step S102: The server determines, according to the geographic location identification information, whether a geographic location of the first electronic terminal and a geographic location of the second electronic terminal satisfy a predetermined condition.

Step S103: The server determines, according to an acceleration value and time corresponding to the acceleration value, whether the acceleration sample information of the first electronic terminal and the acceleration sample information of the second electronic terminal are matched.

Step S104: If the geographic location of the first electronic terminal and the geographic location of the second electronic terminal satisfy the predetermined condition and the acceleration sample information of the first electronic terminal and the acceleration sample information of the second electronic terminal are matched, send first to-be-exchanged data associated with the second electronic terminal to the first electronic terminal, and/or send second to-be-exchanged data associated with the first electronic terminal to the second electronic terminal.

Figure 4:
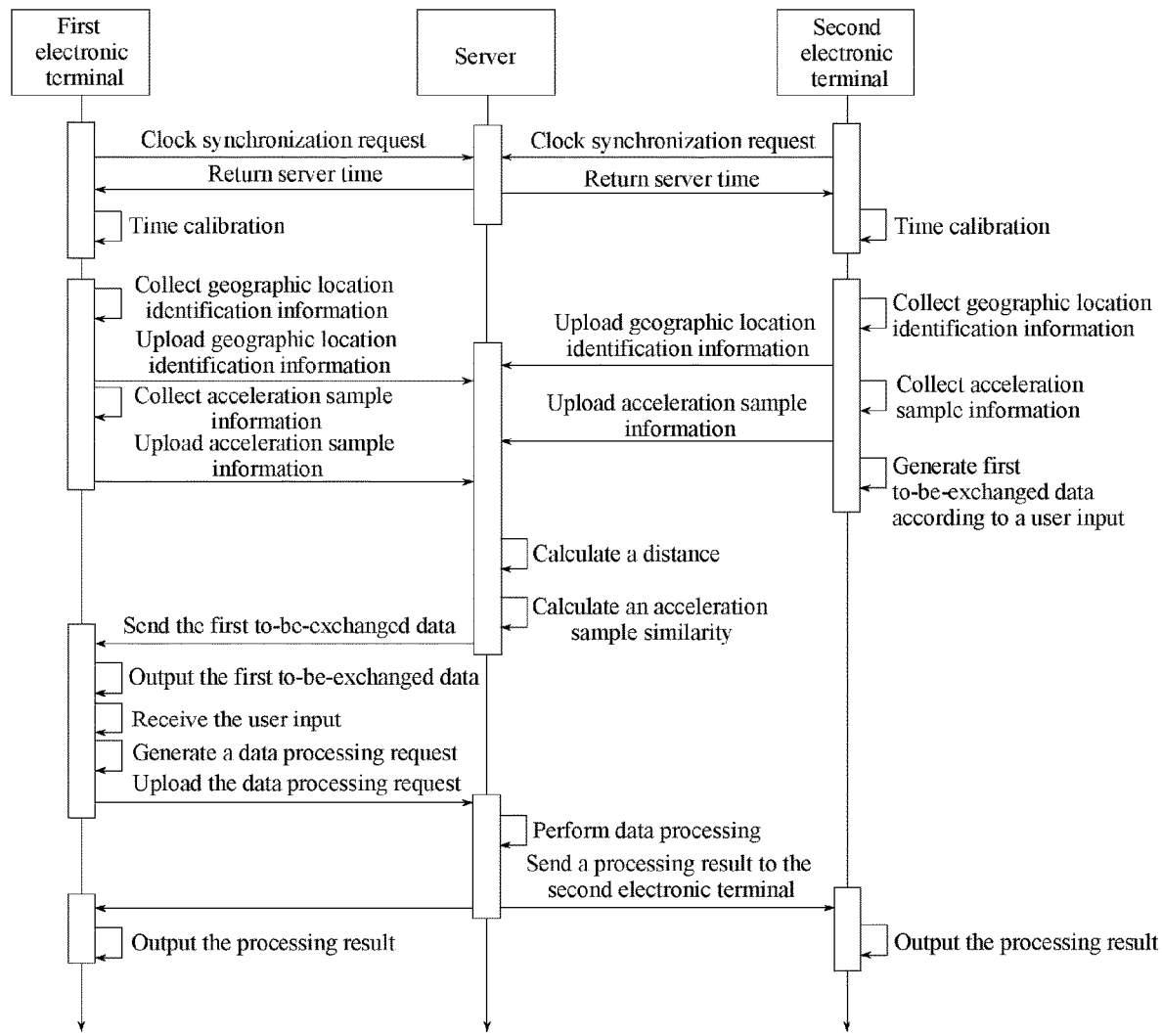
FIG. 4 is a schematic diagram of detailed interaction of the method in FIG. 3.

The method is described in detail below with reference to FIG. 4 and a specific example.

Figure 5:
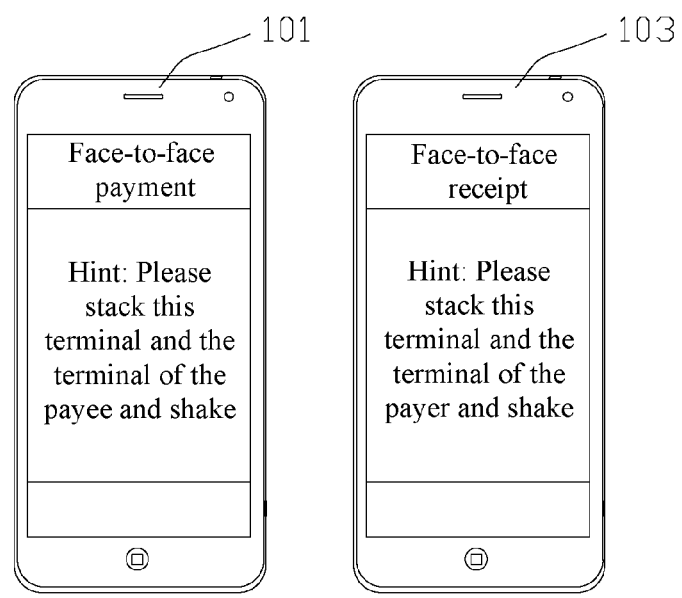
FIG. 5 to FIG. 8 are schematic diagrams of an interface of an application in an electronic terminal.
Figure 6:
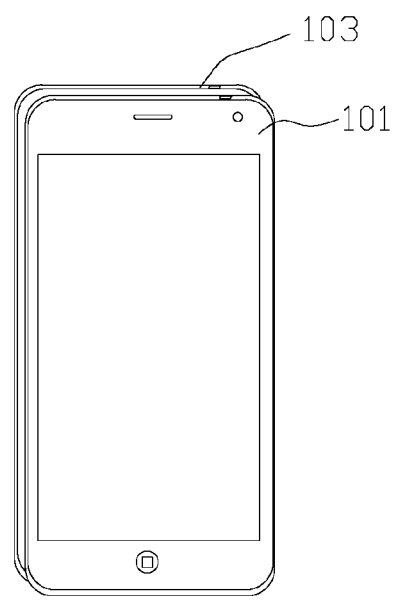

A same application may be installed in each of the first electronic terminal 101 and the second electronic terminal 103. In an example, the application has a face-to-face payment function. The face-to-face payment function has two aspects: face-to-face payment and face-to-face receipt. As shown in FIG. 5, the first electronic terminal 101 displays a face-to-face payment interface of the application, while the second electronic terminal 103 displays a face-to-face receipt interface of the application. Each of the two interfaces displays a prompt to instruct a user to stack the two electronic terminals together and shake.

After the user turns on the face-to-face payment or face-to-face receipt interface, Step S101 may be automatically executed in a backend. Certainly, this embodiment does not limit a triggering process of Step S101. For example, after the interface is turned on, only geographic location identification information is collected, while acceleration sample information is not collected temporarily. When a user input operation, such as a screen touch gesture, a press on a key in the interface or a space motion gesture, is detected, the geographic location identification information begins to be collected. For example, the first electronic terminal 101 and the second electronic terminal 103 are stacked together, and if they are shaken, a process of collecting acceleration sample information is triggered.

The geographic location identification information may, for example, include current geographic location information obtained by the positioning module 116. The current geographic location information may be denoted by using a longitude/latitude or another location identification code. The geographic location identification information may further be other information, such as an IP address, wireless local area network positioning information or mobile communications base station positioning information, which may be programmed to identify a geographic location. In order to distinguish different electronic terminals, the geographic location identification information should further include:

The acceleration sample information includes at least one sample, and each sample includes time and an acceleration value. The acceleration value may be detected by the accelerometer 114, and the time is time when the accelerometer 114 outputs/detects the acceleration value. Collected acceleration samples should satisfy a predetermined frequency or predetermined time, and for the collected samples, useless samples may be removed or merging processing is performed on several consecutive samples to generate a sample to be reported. After the acceleration sample information reaches a threshold of reporting the acceleration sample information in batches, the acceleration sample information may be uploaded to the server, and correspondingly, the server receives the geographic location identification information and the acceleration sample information sent by each of the first electronic terminal and the second electronic terminal.

It can be understood that, time in different electronic terminals may be different, and in order to unify comparison references, it is necessary to make time in acceleration sample information submitted by different electronic terminals be in a same standard. Therefore, referring to FIG. 3 and FIG. 4, before Step S101, the method may further include the following steps: sending, by each of the first electronic terminal and the second electronic terminal, a clock synchronization request to the server; returning correspondingly, by the server, server time to the first electronic terminal and the second electronic terminal according to the clock synchronization request; and performing, by each of the first electronic terminal and the second electronic terminal, clock calibration according to the server time returned by the server. It can be understood that, in order to improve clock calibration precision, the process may be performed multiple times.

After the clock calibration process, the first electronic terminal and the second electronic terminal may calculate a difference between a local clock and a server clock. Therefore, the time in the acceleration sample information may use a same time reference, for example, server time.

Referring to FIG. 5, when the first electronic terminal 101 and the second electronic terminal 103 are stacked together and shaken, it may be expected that at a same moment, acceleration values output by accelerometers of the first electronic terminal 101 and the second electronic terminal 103 are the same.

In Step S102, at first, the geographic location of the first electronic terminal and the geographic location of the second electronic terminal are obtained according to the geographic location identification information of the first electronic terminal and the geographic location identification information of the second electronic terminal respectively. For example, if the geographic location identification information directly includes the geographic location, the geographic location obtained by parsing is directly used as the geographic location of the corresponding electronic terminal; if the geographic location identification information is an IP address, IP addresses may be directly compared, and similar IP addresses are determined to be at a same location; a corresponding geographic location may be further queried in a database of a mapping relationship between an IP address and a geographic location, and the obtained geographic location is used as the geographic location of the corresponding electronic terminal. Other types of geographic location identification information can be deduced by analogy, and are not described again herein.

After the geographic location of the first electronic terminal and the geographic location of the second electronic terminal are obtained, each of the geographic locations is mapped to two points in a same coordinate system, and then the distance between the first electronic terminal and the second electronic terminal may be learned by calculating the distance between the two points. It can be understood that, the distance between two points (x1, y1) and (x2, y2) in a same coordinate system is $D=\sqrt{(x1-x2)^2+(y1-y2)^2}$.

Generally, the GPS civil positioning precision is about 5 meters at most, and is generally about 10 meters. Therefore, for positioning performed in a GPS manner, in Step S102, it is determined whether the geographic locations of the two terminals satisfy the predetermined condition, for example, whether the distance between the two terminals is less than a predetermined threshold. The threshold may be set to 10 meters. When a positioning manner with low precision, such as IP address positioning, is used, the threshold may be a precision range of the positioning manner.

In the process shown in FIG. 3, after Step S102, it is determined whether the acceleration sample information of the first electronic terminal and the acceleration sample information of the second electronic terminal are matched. However, the sequence of Step S102 and Step S103 is not limited, and Step S102 and Step S103 may be interchanged in sequence.

In an example, Step S103 includes the following steps: calculating a similarity between the acceleration sample information of the first electronic terminal and the acceleration sample information of the second electronic terminal according to the time and the acceleration value; and if the similarity exceeds a predetermined threshold, determining that the acceleration sample information of the first electronic terminal and the acceleration sample information of the second electronic terminal are matched. Persons of ordinary skill in the art may calculate the similarity between the two pieces of acceleration sample information by using any appropriate method. For example, records with a same time point in the two pieces of acceleration sample information are paired, and accordingly, an average value or a mean variance of differences between acceleration values in all records is calculated to represent the similarity. It can be understood that, the smaller the average value or mean variance of the differences is, the larger the similarity is.

The preset threshold of the similarity may be set according to a test result. For example, two electronic terminals are placed together to perform various gesture operations, acceleration sample information output by each of the two electronic terminals is recorded, and the similarity between the two pieces of acceleration sample information is calculated according to the method. Then the threshold may be set to a value slightly less than an average value of the test result.

In an example, Step S103 includes the following step: if the acceleration sample information of each of the first electronic terminal and the second electronic terminal includes at least two acceleration value inflection points with same time in a same time range, determining that the acceleration sample information of the first electronic terminal and the acceleration sample information of the second electronic terminal are matched.

It can be understood that, if the first electronic terminal 101 and the second electronic terminal 103 are touched consecutively multiple times in a time range, at a moment when each collision occurs, the acceleration thereof should be violently changed, and the acceleration value at the moment should be the value of an acceleration value inflection point in a nearby period of time. The quantity of electronic terminals whose acceleration values are compared may be limited to a fixed quantity range according to geographic locations. If electronic terminals in a fixed range consecutively have two acceleration value inflection points with same time, it can be determined that these two electronic terminals collide, and the two electronic terminals can be paired.

Further, in order to improve accuracy, on the basis of determining an acceleration value inflection point, time interval check may be added. That is, Step S103 includes the following step: if in a same time range, the acceleration sample information of each of the first electronic terminal and the second electronic terminal includes at least two acceleration value inflection points with same time, and time intervals between adjacent inflection points are the same, determining that the acceleration sample information of the first electronic terminal and the acceleration sample information of the second electronic terminal are matched. The principle of the time interval check lies in that, a time interval between two consecutive touch operations of different users is related to physical states thereof, and in the case of millisecond precision, each person should have a different time interval. On the basis of an acceleration value inflection point, a time interval may further precisely distinguish different users.

It can be understood that, the various manners all identify different user operations by using the acceleration sample mode. In addition to the examples listed above, persons of ordinary skill in the art may further distinguish different user operations by using any other acceleration sample modes.

The aforementioned application may separately log in to the server by using a first user account number and a second user account number. That is to say, the first electronic terminal is bound to the first user account number, and the second electronic terminal is bound to the second user account number. Therefore, the first to-be-exchanged data in Step S104 is also associated with the second user account number.

The first to-be-exchanged data may be any data, such as text, a number, a picture, a voice, a video, a document or the like. However, according to different application scenarios, the first to-be-exchanged data should be specific information at a place. For example, in the face-to-face payment scenario, the first to-be-exchanged data may include the receipt account number of a payee, a sum, related order information and so on. The receipt account number may be a bank account number or an account number of a third party payment system.

The first to-be-exchanged data may be pushed by the server 200 to the first electronic terminal 101, or may be stored in the server 200 and obtained by the first electronic terminal 101 in a polling manner.

Figure 7:
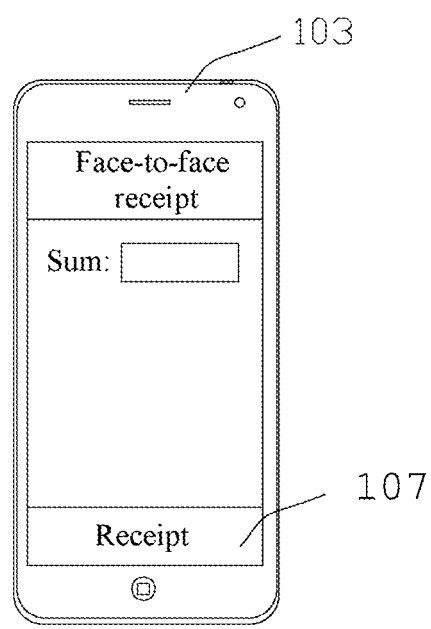

Moreover, the first to-be-exchanged data may be uploaded by the second electronic terminal. For example, before Step S101, the interface in the second electronic terminal 103 is shown in FIG. 7, the user may input a sum to be received in this interface, and after a button 107 is pressed down, the sum is uploaded to the server. Subsequently, the interface in the second electronic terminal 103 becomes that shown in FIG. 5.

That is to say, the second electronic terminal 103 receives an input of a second user, generates the first to-be-exchanged data according to the input of the second user, and uploads the first to-be-exchanged data to the server. Therefore, the sum paid this time may be transmitted to the first electronic terminal 101.

However, relatively fixed information such as the receipt account number may be directly stored in the server, and may be found through an association by using the second user account number. When needed, the information may be directly obtained, and included in the first to-be-exchanged data.

The second to-be-exchanged data is substantially similar to the first to-be-exchanged data, and is not described again herein.

Further, after receiving the first to-be-exchanged data sent by the server, the first electronic terminal 101 may output the first to-be-exchanged data, receive data input by a first user, generate a data processing request according to the first to-be-exchanged data and the data input by the first user, and send the data processing request to the server.

Correspondingly, the server 200 invokes a public interface of a third party data processing system according to the data processing request; receives a processing result returned by the third party data processing system; and sends the processing result to the second electronic terminal 103. The server 200 may also perform the data processing process by itself, and directly send the processing result to the second electronic terminal 103.

In an example, the first to-be-exchanged data includes a payee account number and a sum. After the first electronic terminal 101 receives the first to-be-exchanged data, the payee account number and the sum are output in the interface shown in FIG. 8. If the user inputs a password and presses the button 105, the first electronic terminal 101 generates a payment request (data processing request), and sends the payment request to the server 200. It can be understood that, if the first to-be-exchanged data does not include the sum, the user may input the sum.

After receiving the payment request, the server 200 performs parsing to obtain information such as the payer account number, the payee account number, the sum, the password and so on, and confirms whether the password input by the user is correct; and if correct, transfers a designated sum out from the payer account number and transfers the designated sum to the payee account number.

Further, the server 200 returns a data processing result to each of the first electronic terminal 101 and the second electronic terminal 103. Each of the first electronic terminal 101 and the second electronic terminal 103 may output a corresponding result. Therefore, the server 200 completes a data processing operation required for payment.

According to the data exchange method between electronic terminals provided in this embodiment, electronic terminals at a same place (or in a range) are obtained through sifting by using geographic locations, and then two electronic terminals which are currently contacting each other are decided by comparing modes of acceleration sample information collected by different electronic terminals in a same time range, so that data can be exchanged rapidly between the two electronic terminals, input operations of a user can be reduced, and efficiency of data exchange and data processing can be improved.

Third Embodiment

Figure 9:
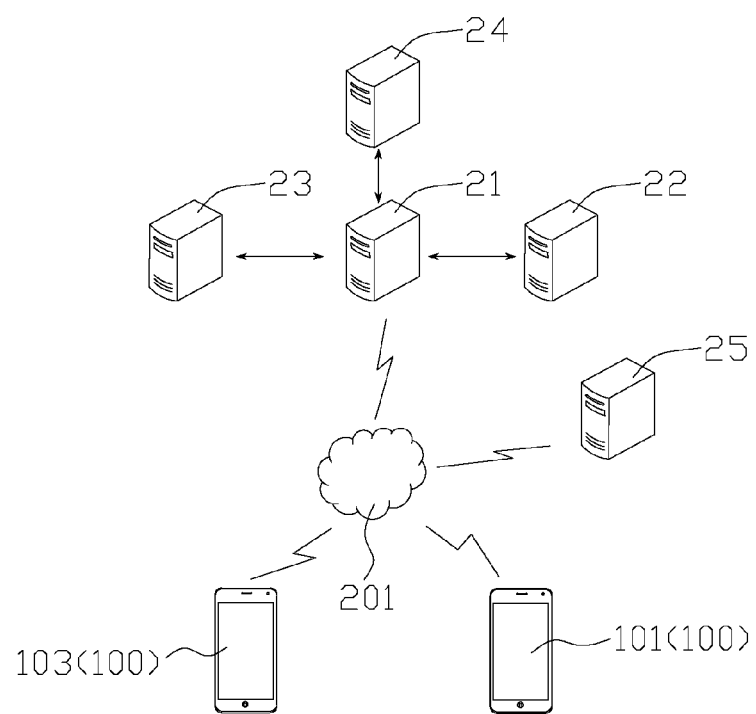
FIG. 9 is a schematic architectural diagram of a data exchange system according to a third embodiment of the present disclosure.

This embodiment provides a data exchange system. Referring to FIG. 9, the data exchange system is similar to that in the first embodiment, and the difference between them lies in that, a server 200 specifically includes: an exchange server 21, a geographic location server 22, an acceleration server 23, a payment server 24, and a time service server 25. The exchange server 21 and the time service server 25 may be connected to a network 201, and the exchange server 21, the geographic location server 22, the acceleration server 23, and the payment server 24 may be located in an enterprise network.

A first electronic terminal 101 and a second electronic terminal 103 may send a clock synchronization request to the time service server 25 to calibrate a clock, and therefore it may be ensured that the clock reference of the first electronic terminal 101 is the same as that of the second electronic terminal 103.

After collecting geographic location identification information and acceleration sample information, each of the first electronic terminal 101 and the second electronic terminal 103 sends them to the exchange server 21.

The first electronic terminal 101 may further send, in addition to the geographic location identification information and the acceleration sample information, a data obtaining request to the exchange server 21.

The exchange server 21 forwards the geographic location identification information to the geographic location server 22, and forwards the acceleration sample information to the acceleration server 23.

According to the data obtaining request sent by the first electronic terminal 101, the exchange server 21 sends, to the geographic location server 22, a querying request, which is programmed to obtain all other electronic terminals in a predetermined range nearby the first electronic terminal 101.

Correspondingly, the geographic location server 22 calculates distances between different electronic terminals and the first electronic terminal 101, so as to obtain all other electronic terminals in the predetermined range nearby the first electronic terminal 101. Therefore, it can be understood that, all other electronic terminals described above should include the second electronic terminal 103. The geographic location server 22 returns all other matched electronic terminals to the exchange server 21.

The exchange server 21 sends a matching request to the acceleration server 23, where the matching request is programmed to request the acceleration server 23 to determine whether the acceleration sample information uploaded by the first electronic terminal 101 and acceleration sample information uploaded by all other electronic terminals described above are matched. For the specific matching rule, reference may be made to related description in the second embodiment, which is not repeated again herein. The acceleration server 23 returns a matching result to the exchange server 21.

The exchange server 21 may pair the first electronic terminal 101 and the second electronic terminal 103 according to the matching result returned by the acceleration server 23. The exchange server 21 may then send the first to-be-exchanged data associated with the second electronic terminal 103 to the first electronic terminal 101.

The first electronic terminal 101 outputs the first to-be-exchanged data, receives the data input by the user, generates a data processing request according to the data input by the user and the first to-be-exchanged data, and sends the data processing request to the exchange server 21.

The exchange server 21 completes data processing according to the data processing request. In an example, if the data processing request is a payment request, the exchange server 21 sends the payment request to the payment server 24. The payment request should include information such as a payee account number, a payer account number, and a sum.

In this embodiment, the geographic location identification information and the acceleration sample information are uploaded to the exchange server 21, and then forwarded by the exchange server 21 to the geographic location server 22 and the acceleration server 23. However, this embodiment is not limited to this manner. For example, the geographic location identification information and the acceleration sample information may be further directly uploaded by an electronic terminal to the geographic location server 22 and the acceleration server 23.

According to different demands, the architecture of this embodiment may be further changed. For example, the geographic location server 22 and the acceleration server 23 are merged into a same server.

According to the data exchange system of this embodiment, different functions are distributed in different servers, thereby helping to improve performance of the server.

Fourth Embodiment

Figure 10:
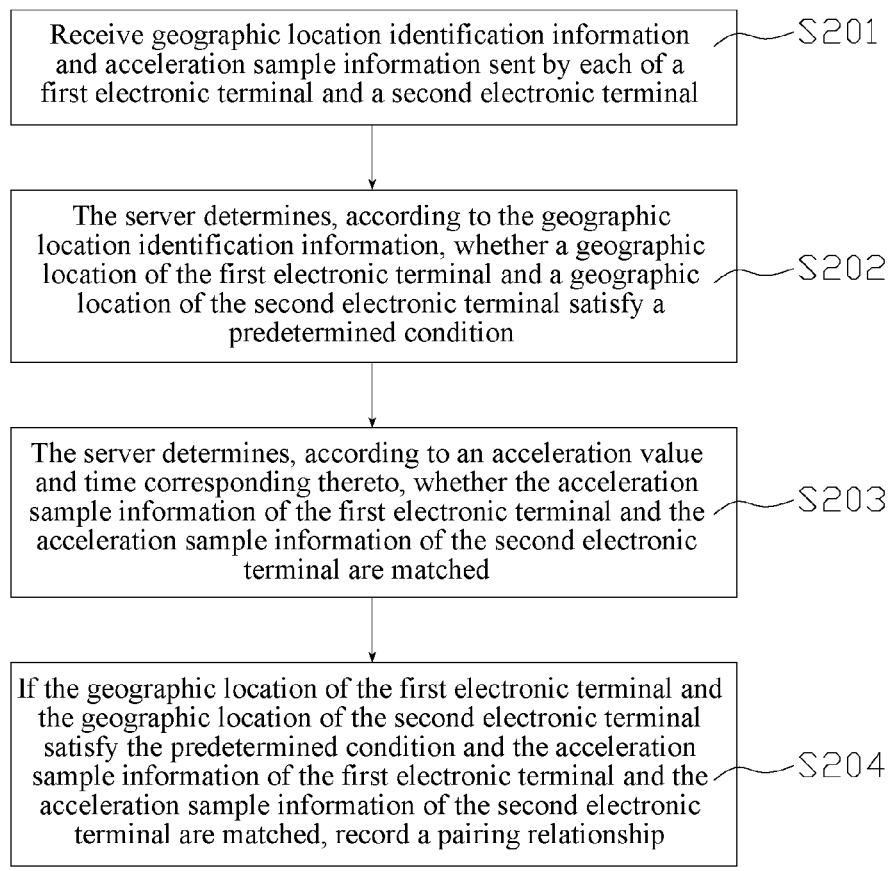
FIG. 10 is a flowchart of a user pairing method according to a fourth embodiment of the present disclosure.

This embodiment provides a user pairing method, which may be used in the server 200 shown in FIG. 1. Referring to FIG. 10, the method includes the following steps:

Step S201: Receive geographic location identification information and acceleration sample information sent by each of a first electronic terminal and a second electronic terminal, where the acceleration sample information includes at least one sample, and each sample includes time and an acceleration value.

Step S202: Determine, according to the geographic location identification information, whether a geographic location of the first electronic terminal and a geographic location of the second electronic terminal satisfy a predetermined condition.

Step S203: Determine, according to the acceleration value and the time corresponding to the acceleration value, whether the acceleration sample information of the first electronic terminal and the acceleration sample information of the second electronic terminal are matched.

Step S204: If the geographic location of the first electronic terminal and the geographic location of the second electronic terminal satisfy the predetermined condition and the acceleration sample information of the first electronic terminal and the acceleration sample information of the second electronic terminal are matched, record a pairing relationship between a first user and a second user which are associated with the first electronic terminal and the second electronic terminal respectively.

It can be seen by comparing FIG. 3 and FIG. 10 that, the method of this embodiment is substantially similar to that of the second embodiment, and the difference between them lies in that, in Step S204, instead of sending the to-be-exchanged data, a pairing relationship between the first user and the second user which are associated with the first electronic terminal and the second electronic terminal respectively is recorded.

The pairing relationship may be programmed to perform subsequent data processing, for example, establishing a group including the first user and the second user, performing data exchange between the first user and the second user to perform identity verification, creating a new game for the first user and the second user, and the like.

According to the user pairing method provided by this embodiment, electronic terminals at a same place (or in a range) are obtained through sifting by using geographic locations, and then two electronic terminals which are currently contacting each other are decided by comparing modes of acceleration sample information collected by different electronic terminals in a same time range, so that a pairing relationship between users associated with two electronic terminals may be rapidly established, and then subsequent data processing may be performed.

Fifth Embodiment

Figure 11:
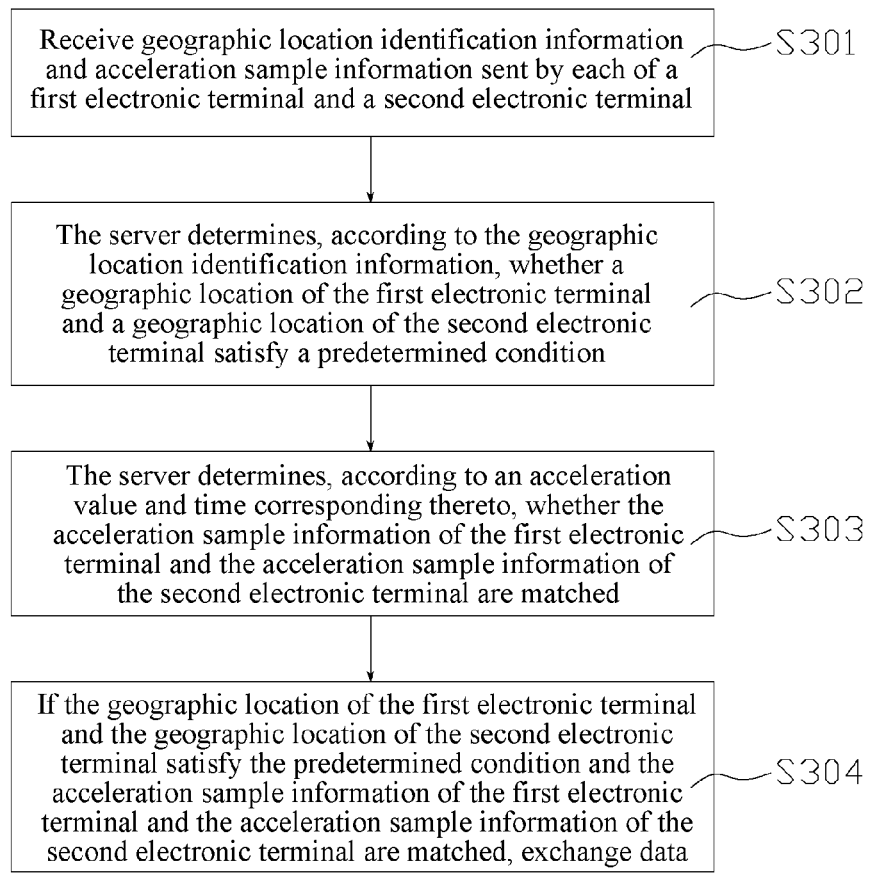
FIG. 11 is a flowchart of a data exchange method according to a fifth embodiment of the present disclosure.

This embodiment provides a data exchange method between different electronic terminals, which is used in the server 200 shown in FIG. 1. Referring to FIG. 11, the method includes the following steps:

Step S301: Receive geographic location identification information and acceleration sample information sent by each of a first electronic terminal and a second electronic terminal.

Step S302: Determine, according to the geographic location identification information, whether a geographic location of the first electronic terminal and a geographic location of the second electronic terminal satisfy a predetermined condition.

Step S303: Determine, according to an acceleration value and time corresponding to the acceleration value, whether the acceleration sample information of the first electronic terminal and the acceleration sample information of the second electronic terminal are matched.

Step S304: If the geographic location of the first electronic terminal and the geographic location of the second electronic terminal satisfy the predetermined condition and the acceleration sample information of the first electronic terminal and the acceleration sample information of the second electronic terminal are matched, send first to-be-exchanged data associated with the second electronic terminal to the first electronic terminal, and/or send second to-be-exchanged data associated with the first electronic terminal to the second electronic terminal.

According to the data exchange method between electronic terminals provided in this embodiment, electronic terminals at a same place (or in a range) are obtained through sifting by using geographic locations, and then two electronic terminals which are currently contacting each other are decided by comparing modes of acceleration sample information collected by different electronic terminals in a same time range, so that data can be exchanged rapidly between the two electronic terminals, input operations of a user can be reduced, and efficiency of data exchange and data processing can be improved.

Sixth Embodiment

Figure 12:
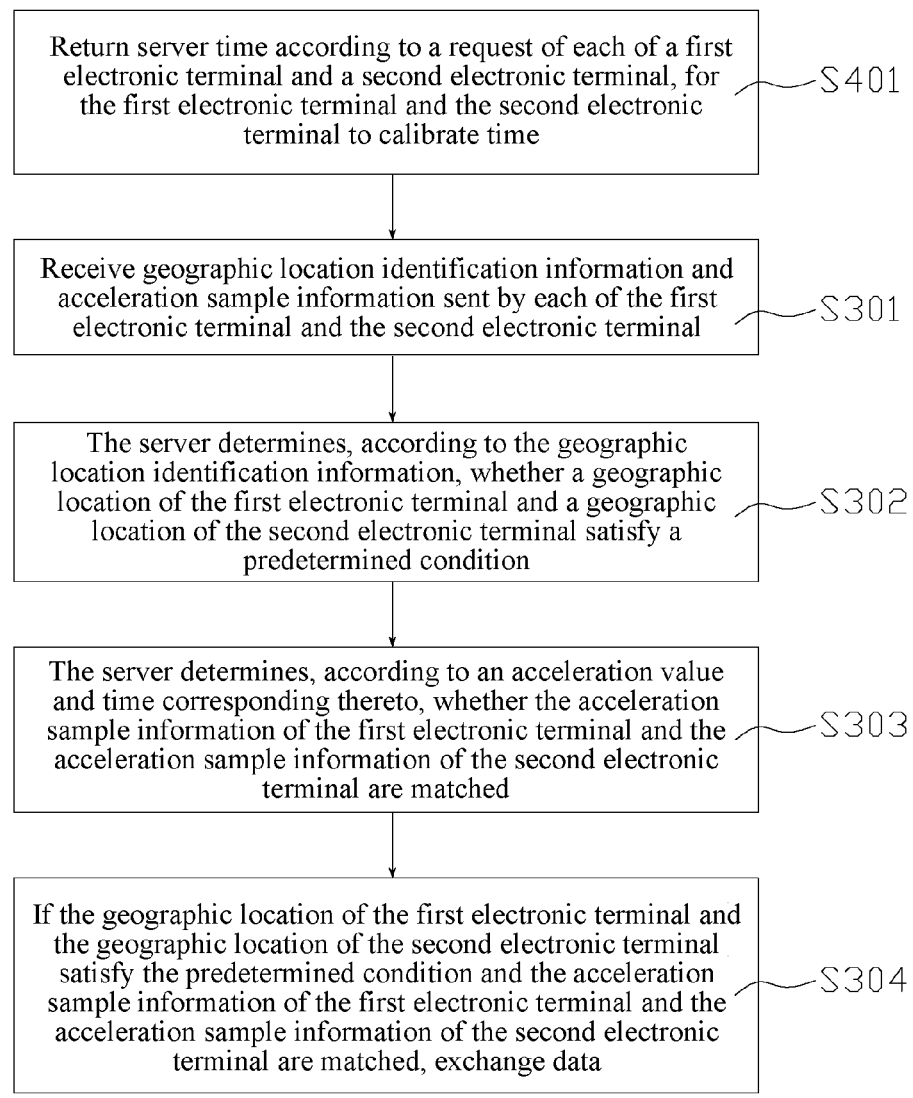
FIG. 12 is a flowchart of a data exchange method according to a sixth embodiment of the present disclosure.

This embodiment provides a data exchange method between different electronic terminals, which is used in the server 200 shown in FIG. 1. Referring to FIG. 12, the method of this embodiment is similar to that of FIG. 11, and the difference between them lies in that, before Step S301, the method further includes the following steps:

Step S401: Return server time according to a request of each of the first electronic terminal and the second electronic terminal, for the first electronic terminal and the second electronic terminal to calibrate time.

Each of the first electronic terminal 101 and the second electronic terminal 103 sends a clock synchronization request to the server; correspondingly, the server returns server time to the first electronic terminal 101 and the second electronic terminal 103 according to the clock synchronization request; each of the first electronic terminal 101 and the second electronic terminal 103 performs clock calibration according to the server time returned by the server. It can be understood that, in order to improve clock calibration precision, the process may be performed multiple times.

According to the data exchange method between electronic terminals provided in this embodiment, a clock calibration operation is further performed, so that time references of different electronic terminals may be consistent, which facilitates comparison of the acceleration sample information.

Seventh Embodiment

Figure 13:
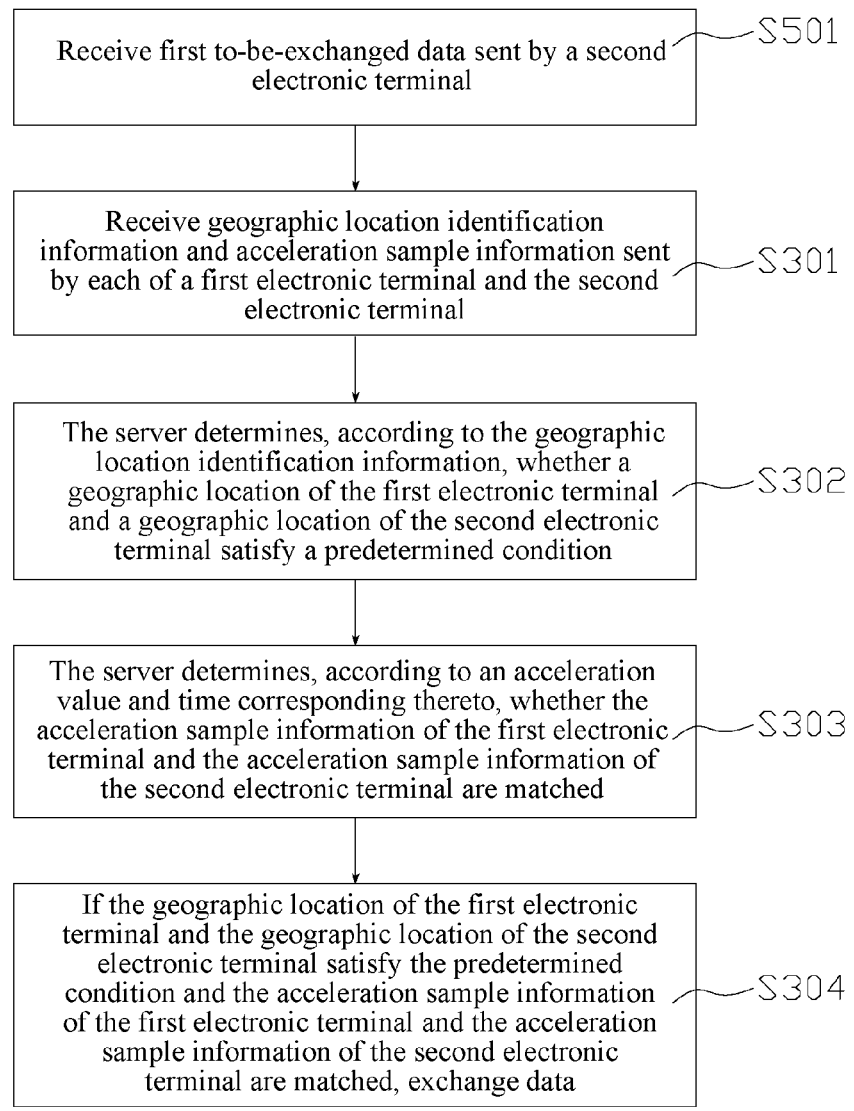
FIG. 13 is a flowchart of a data exchange method according to a seventh embodiment of the present disclosure.

This embodiment provides a data exchange method between different electronic terminals, which is used in the server 200 shown in FIG. 1. Referring to FIG. 13, the method of this embodiment is similar to that of FIG. 11, and the difference between them lies in that, before Step S301, the method further includes the following step:

Step S501: Receive the first to-be-exchanged data sent by the second electronic terminal.

Referring to FIG. 7, for example, before Step S301, the user may input data to the second electronic terminal 103, for example, the sum to be received, and after the button 107 is pressed, the second electronic terminal 103 generates first to-be-exchanged data according to the input data, and uploads the first to-be-exchanged data to the server 200.

Correspondingly, in Step S501, the server 200 receives the first to-be-exchanged data sent by the second electronic terminal 103.

In the manner, the first to-be-exchanged data may be forwarded to the first electronic terminal 101, and therefore the input operations of the user in the first electronic terminal 101 may be reduced.

Moreover, the first to-be-exchanged data is not limited to being uploaded by the second electronic terminal 103. For example, the second electronic terminal 103 is bound to the second user, and the first to-be-exchanged data is found through an association according to the second user. For example, the receipt account number pre-stored by the second user in the server or the published commodity information may be directly read from the server, and the receipt account number and the commodity information are directly used as the first to-be-exchanged data.

According to the data exchange method between electronic terminals provided in this embodiment, the first to-be-exchanged data associated with the second electronic terminal may be conveniently forwarded to the first electronic terminal.

Eighth Embodiment

Figure 14:
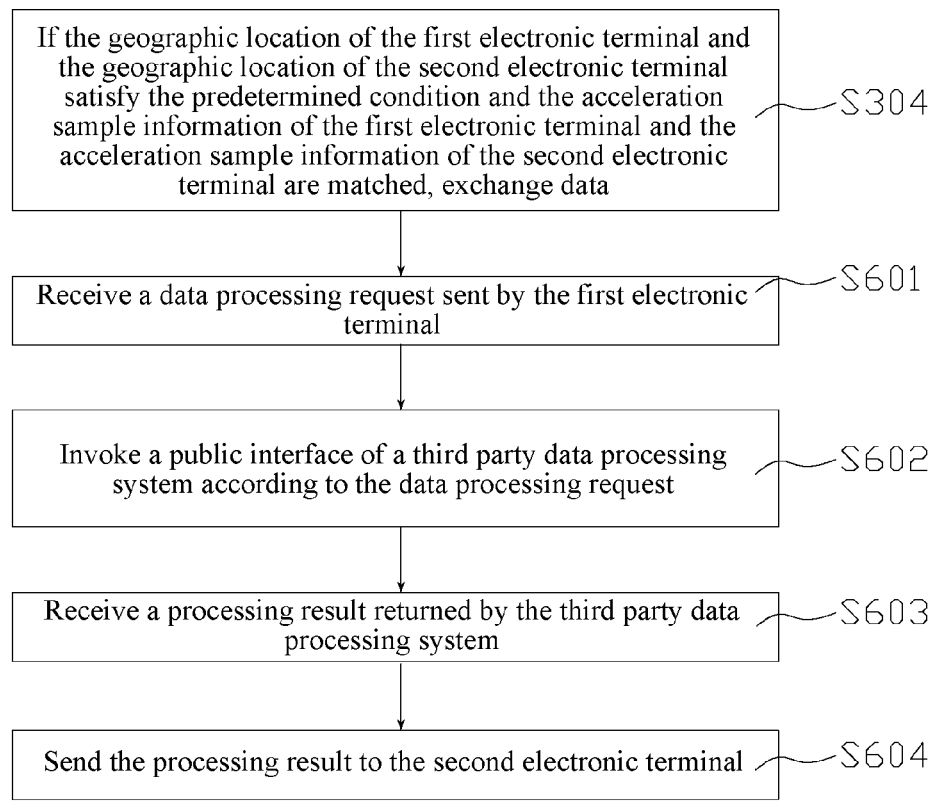
FIG. 14 is a flowchart of a data exchange method according to an eighth embodiment of the present disclosure.

This embodiment provides a data exchange method between different electronic terminals, which is used in the server 200 shown in FIG. 1. Referring to FIG. 14, the method of this embodiment is similar to that of FIG. 11, and the difference between them lies in that, after Step S304, the method further includes the following steps:

Step S601: Receive a data processing request sent by the first electronic terminal.

After receiving the first to-be-exchanged data sent by the server, the first electronic terminal 101 may output the first to-be-exchanged data, receive data input by a first user, generate a data processing request according to the first to-be-exchanged data and the data input by the first user, and send the data processing request to the server. Correspondingly, the server 200 receives the data processing request sent by the first electronic terminal 101.

In an example, the first to-be-exchanged data includes a payee account number and a sum. After the first electronic terminal 101 receives the first to-be-exchanged data, the payee account number and the sum are output in the interface shown in FIG. 8. If the user inputs a password and presses the button 105, the first electronic terminal 101 generates a payment request (data processing request), and sends the payment request to the server 200. It can be understood that, if the first to-be-exchanged data does not include the sum, the user may input the sum.

Step S602: Invoke a public interface of a third party data processing system according to the data processing request.

For example, a payment interface of a third party payment system is invoked, and payment data processing is performed according to the payment request.

Step S603: Receive a processing result returned by the third party data processing system.

After completing data processing, the third party data processing system returns a processing result to the server 200.

Step S604: Send the processing result to the second electronic terminal.

In this embodiment, a specific data processing operation is performed by the third party data processing system, but the server 200 may further perform a data processing operation, and directly send the processing result to the second electronic terminal 103.

In another aspect, the data processing result may be further sent to the first electronic terminal 101. Moreover, processing results of the first electronic terminal 101 and the second electronic terminal 103 may also be different.

According to the data exchange method between different electronic terminals in this embodiment, in addition to completing data exchange, a data processing operation may be further performed in the server to implement a specific data processing function, so that the user may trigger the data processing function in a very simple manner.

Ninth Embodiment

Figure 15:
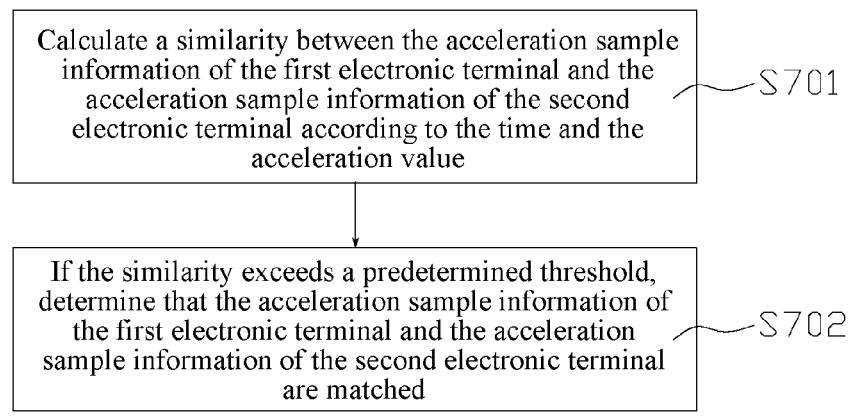
FIG. 15 is a flowchart of a part of steps of a data exchange method according to a ninth embodiment of the present disclosure.

This embodiment provides a data exchange method between different electronic terminals, which is used in the server 200 shown in FIG. 1. The method of this embodiment is similar to that of FIG. 11, and the difference between them lies in that, referring to FIG. 15, Step S303 includes the following steps:

Step S701: Calculate a similarity between the acceleration sample information of the first electronic terminal and the acceleration sample information of the second electronic terminal according to the time and the acceleration value.

Step S702: If the similarity exceeds a predetermined threshold, determine that the acceleration sample information of the first electronic terminal and the acceleration sample information of the second electronic terminal are matched.

Persons of ordinary skill in the art may calculate the similarity between the two pieces of acceleration sample information by using any appropriate method. For example, records with a same time point in the two pieces of acceleration sample information are paired, and accordingly, an average value or a mean variance of differences between acceleration values in all records is calculated to represent the similarity. It can be understood that, the smaller the average value or mean variance of the differences is, the larger the similarity is.

The preset threshold of the similarity may be set according to a test result. For example, two electronic terminals are placed together to perform various gesture operations, acceleration sample information output by each of the two electronic terminals is recorded, and the similarity between the two pieces of acceleration sample information is calculated according to the method. Then the threshold may be set to a value slightly less than an average value of the test result.

The method of this embodiment provides a method for determining whether two pieces of acceleration sample information are matched by calculating a similarity between acceleration samples.

Tenth Embodiment

Figure 16:
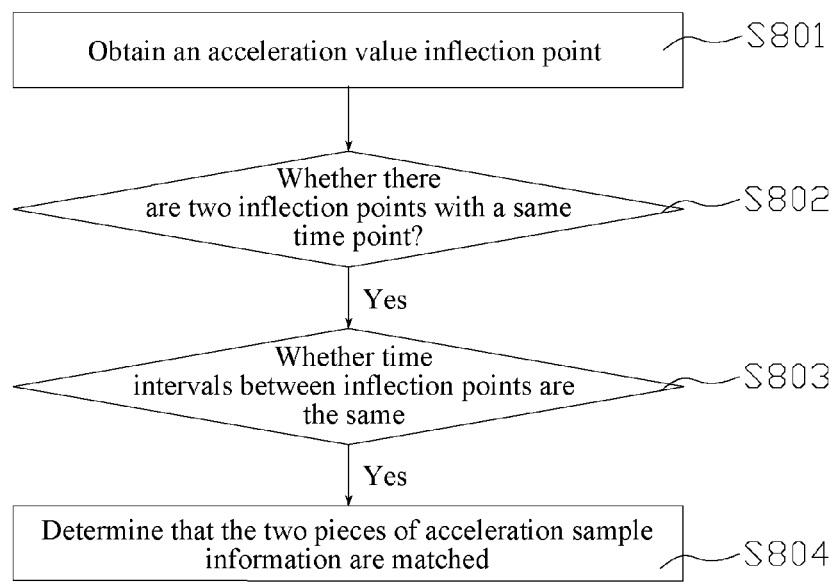
FIG. 16 is a flowchart of a part of steps of a data exchange method according to a tenth embodiment of the present disclosure.

This embodiment provides a data exchange method between different electronic terminals, which is used in the server 200 shown in FIG. 1. The method of this embodiment is similar to that of FIG. 11, and the difference between them lies in that, referring to FIG. 16, Step S303 includes the following steps:

Step S801: Obtain an acceleration value inflection point according to the acceleration sample information of the first electronic terminal and the acceleration sample information of the second electronic terminal.

The acceleration value inflection point refers to a point whose acceleration value in the acceleration sample information is apparently different from a nearby acceleration value, for example, a point whose acceleration value suddenly becomes a negative value from zero or is suddenly reduced to a large extent.

Step S802: Determine whether there are two inflection points with a same time point; if yes, execute Step S803, or otherwise, determine that the two pieces of acceleration sample information are not matched.

Step S803: Determine whether time intervals between inflection points are the same; if yes, execute Step S804, or otherwise, determine that the two pieces of acceleration sample information are not matched.

It can be understood that, the sameness does not mean absolute sameness, and if a difference between two values falls in an allowable error range, it may be determined that the two values are the same. Moreover, the time measurement error depends on the allowable error range.

Step S804: Determine that the two pieces of acceleration sample information are matched.

It can be understood that, if the first electronic terminal 101 and the second electronic terminal 103 are touched consecutively multiple times in a time range, at a moment when each collision occurs, the acceleration thereof should be violently changed, and the acceleration value at the moment should be the value of an acceleration value inflection point in a nearby period of time. The quantity of electronic terminals whose acceleration values are compared may be limited to a fixed quantity range according to geographic locations. If electronic terminals in a fixed range consecutively have two acceleration value inflection points with same time, it can be determined that these two electronic terminals collide, and the two electronic terminals can be paired.

The principle of the time interval check lies in that, a time interval between two consecutive touch operations of different users is related to physical states thereof, and in the case of millisecond precision, each person should have a different time interval. On the basis of an acceleration value inflection point, a time interval may further precisely distinguish different users.

In this embodiment, Step S803 may be further omitted, that is, pairing between electronic terminals is performed only by using an acceleration inflection point value.

It can be understood that, the various manners all identify different user operations by using the acceleration sample mode. In addition to the examples listed above, persons of ordinary skill in the art may further distinguish different user operations by using any other acceleration sample modes.

According to the method of this embodiment, two electronic terminals may implement pairing at a server end only by consecutively touching each other several times with depending on a manner of two-dimensional code or acoustic wave, and a use manner is simple for a user, so that data exchange between different electronic terminals may be efficiently implemented.

Eleventh Embodiment

Figure 17:
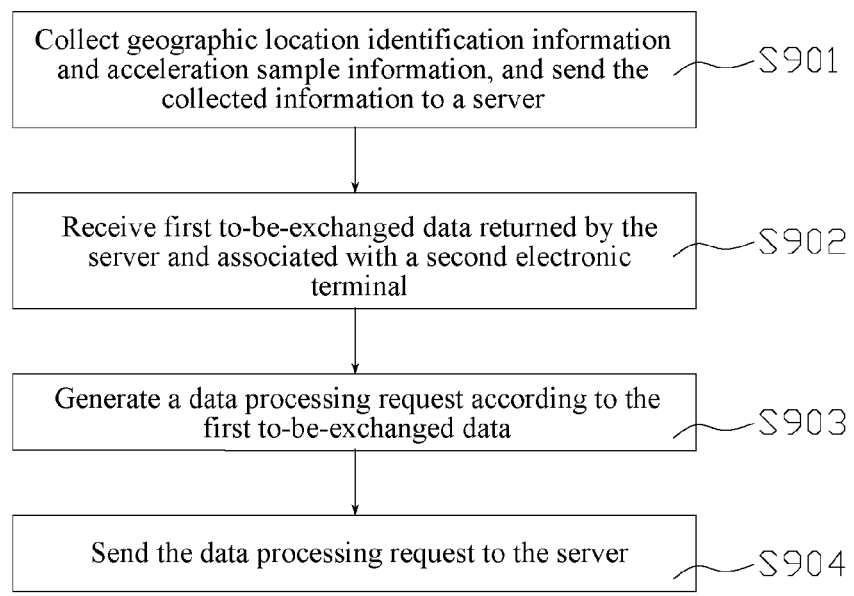
FIG. 17 is a flowchart of a data exchange method according to an eleventh embodiment of the present disclosure.

This embodiment provides a data exchange method between different electronic terminals, which is used in the first electronic terminal 101 shown in FIG. 1. Referring to FIG. 17, the method includes the following steps:

Step S901: Collect geographic location identification information and acceleration sample information of the first electronic terminal, and send the collected information to a server.

An application may be installed in the first electronic terminal 101. In an example, the application has a face-to-face payment function. The face-to-face payment function has two aspects: face-to-face payment and face-to-face receipt. As shown in FIG. 5, the first electronic terminal 101 displays a face-to-face payment interface of the application.

After the user turns on the face-to-face payment interface, Step S901 may be automatically executed in a backend. Certainly, this embodiment does not limit a triggering process of Step S901. For example, after the interface is turned on, only geographic location identification information is collected, while acceleration sample information is not collected temporarily. When a user input operation, such as a screen touch gesture, a press on a key in the interface or a space motion gesture, is detected, the geographic location identification information begins to be collected. For example, if the first electronic terminal 101 is shaken, a process of collecting the acceleration sample information is triggered.

Step S902: Receive first to-be-exchanged data returned by the server and associated with the second electronic terminal.

The data sent in Step S901 is used by the server for being matched with data sent by another electronic terminal, and if the first electronic terminal 101 and the second electronic terminal 103 are matched successfully, the server 200 may send the first to-be-exchanged data associated with the second electronic terminal to the first electronic terminal 101.

Step S903: Generate a data processing request according to the first to-be-exchanged data.

Figure 8:
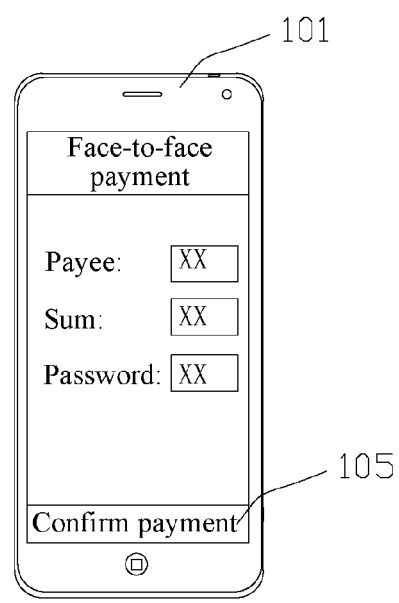

Referring to FIG. 8, after receiving the first to-be-exchanged data, the first electronic terminal 101 outputs the first to-be-exchanged data, receives data input by a first user, and generate the data processing request according to the first to-be-exchanged data and the data input by the first user.

Step S904: Send the data processing request to the server.

After receiving the data processing request, the server correspondingly performs data processing, and sends a processing result to the second electronic terminal 103.

According to the method of this embodiment, as long as the first electronic terminal 101 and the second electronic terminal 103 are shaken together or are touched consecutively, pairing between the first electronic terminal 101 and the second electronic terminal 103 is implemented in the server, without depending on a manner of two-dimensional code or acoustic wave, and a use manner is simple for a user, so that data exchange between different electronic terminals may be efficiently implemented.

Twelfth Embodiment

Figure 18:
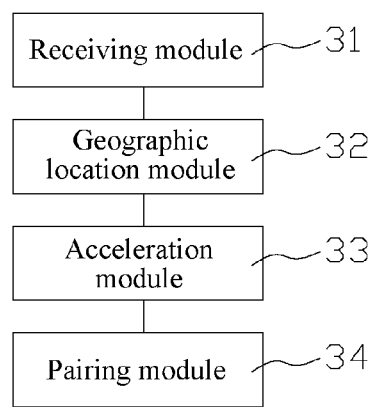
FIG. 18 is a structural block diagram of a user pairing apparatus according to a twelfth embodiment of the present disclosure.

This embodiment provides a user pairing apparatus, which is used in the server 200 shown in FIG. 1. Referring to FIG. 18, the apparatus includes: a receiving module 31, a geographic location module 32, an acceleration module 33, and a pairing module 34.

The receiving module 31 is programmed to receive geographic location identification information and acceleration sample information sent by each of a first electronic terminal and a second electronic terminal, where the acceleration sample information includes at least one sample, and each sample includes time and an acceleration value.

The geographic location module 32 is programmed to calculate a distance between the first electronic terminal and the second electronic terminal according to the geographic location identification information.

The acceleration module 33 is programmed to: if the distance is less than a predetermined threshold, determine, according to the time and the acceleration value, whether the acceleration sample information of the first electronic terminal and the acceleration sample information of the second electronic terminal are matched.

In an example, the acceleration module 33 is programmed to: calculate a similarity between the acceleration sample information of the first electronic terminal and the acceleration sample information of the second electronic terminal according to the time and the acceleration value; and if the similarity exceeds a predetermined threshold, determining that the acceleration sample information of the first electronic terminal and the acceleration sample information of the second electronic terminal are matched.

In an example, the acceleration module 33 is programmed to: if the acceleration sample information of each of the first electronic terminal and the second electronic terminal includes at least two acceleration value inflection points with same time, determine that the acceleration sample information of the first electronic terminal and the acceleration sample information of the second electronic terminal are matched.

In an example, the acceleration module 33 is programmed to: if the acceleration sample information of each of the first electronic terminal and the second electronic terminal includes at least two acceleration value inflection points with same time, and time intervals between inflection points are the same, determine that the acceleration sample information of the first electronic terminal and the acceleration sample information of the second electronic terminal are matched.

The pairing module 34 is programmed to: if the acceleration sample information of the first electronic terminal and the acceleration sample information of the second electronic terminal are matched, record a pairing relationship between a first user and a second user which are associated with the first electronic terminal and the second electronic terminal respectively.

According to the apparatus provided in this embodiment, electronic terminals at a same place (or in a range) are obtained through sifting by using geographic locations, and then two electronic terminals which are currently contacting each other are decided by comparing modes of acceleration sample information collected by different electronic terminals in a same time range, so that a pairing relationship between users associated with two electronic terminals may be rapidly established, and then subsequent data processing may be performed.

Thirteenth Embodiment

Figure 19:
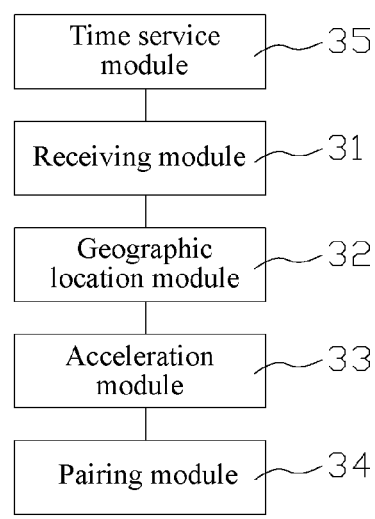
FIG. 19 is a structural block diagram of a user pairing apparatus according to a thirteenth embodiment of the present disclosure.

This embodiment provides a user pairing apparatus, which is used in the server 200 shown in FIG. 1. Referring to FIG. 19, the apparatus of this embodiment is similar to that in FIG. 18, and the difference between them lies in that, the apparatus of this embodiment further includes: a time service module 35, programmed to return server time according to a request of each of the first electronic terminal and the second electronic terminal, for the first electronic terminal and the second electronic terminal to calibrate time.

According to the apparatus of this embodiment, the time in the acceleration sample information is time calibrated by the server, and therefore it can be ensured that different electronic terminals use a same time reference, which facilitates time comparison.

Fourteenth Embodiment

Figure 20:
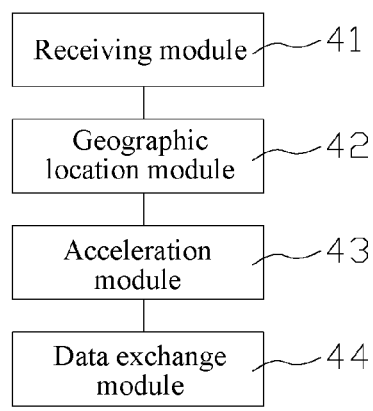
FIG. 20 is a structural block diagram of a data exchange apparatus according to a fourteenth embodiment of the present disclosure.

This embodiment provides a data exchange apparatus, which is used in the server 200 shown in FIG. 1. Referring to FIG. 20, the apparatus includes: a receiving module 41, a geographic location module 42, an acceleration module 43, and a data exchange module 44.

The receiving module 41 is programmed to receive geographic location identification information and acceleration sample information sent by each of a first electronic terminal and a second electronic terminal, where the acceleration sample information includes at least one sample, and each sample includes time and an acceleration value.

The geographic location module 42 is programmed to calculate a distance between the first electronic terminal and the second electronic terminal according to the geographic location identification information, and determining whether the distance is less than a predetermined threshold.

The acceleration module 43 is programmed to: if the distance is less than a predetermined threshold, determine whether the acceleration sample information of the first electronic terminal and the acceleration sample information of the second electronic terminal are matched.

In an example, the acceleration module 33 is programmed to calculate a similarity between the acceleration sample information of the first electronic terminal and the acceleration sample information of the second electronic terminal according to the time and the acceleration value; and if the similarity exceeds a predetermined threshold, determining that the acceleration sample information of the first electronic terminal and the acceleration sample information of the second electronic terminal are matched.

In an example, the acceleration module 33 is programmed to: if the acceleration sample information of each of the first electronic terminal and the second electronic terminal includes at least two acceleration value inflection points with same time, determine that the acceleration sample information of the first electronic terminal and the acceleration sample information of the second electronic terminal are matched.

In an example, the acceleration module 33 is programmed to: if the acceleration sample information of each of the first electronic terminal and the second electronic terminal includes at least two acceleration value inflection points with same time, and time intervals between inflection points are the same, determine that the acceleration sample information of the first electronic terminal and the acceleration sample information of the second electronic terminal are matched.

The data exchange module 44 is programmed to: if the acceleration sample information of the first electronic terminal and the acceleration sample information of the second electronic terminal are matched, exchange data between the first electronic terminal and the second electronic terminal. The data exchange may include: sending first to-be-exchanged data associated with the second electronic terminal to the first electronic terminal, and/or sending second to-be-exchanged data associated with the first electronic terminal to the second electronic terminal.

According to the apparatus provided in this embodiment, electronic terminals at a same place (or in a range) are obtained through sifting by using geographic locations, and then two electronic terminals which are currently contacting each other are decided by comparing modes of acceleration sample information collected by different electronic terminals in a same time range, so that data can be exchanged rapidly between the two electronic terminals, input operations of a user can be reduced, and efficiency of data exchange and data processing can be improved.

Fifteenth Embodiment

Figure 21:
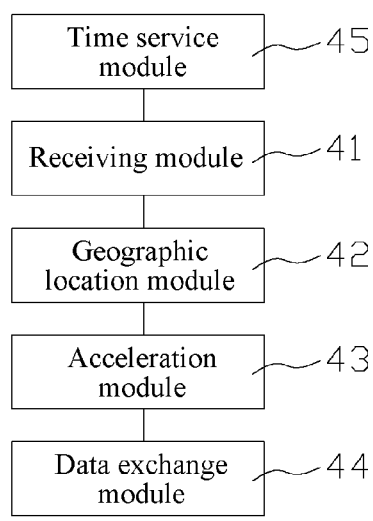
FIG. 21 is a structural block diagram of a data exchange apparatus according to a fifteenth embodiment of the present disclosure.

This embodiment provides a data exchange apparatus, which is used in the server 200 shown in FIG. 1. Referring to FIG. 21, the apparatus of this embodiment is similar to that in FIG. 20, and the difference between them lies in that, the apparatus of this embodiment further includes: a time service module 45, programmed to return server time according to a request of each of the first electronic terminal and the second electronic terminal, for the first electronic terminal and the second electronic terminal to calibrate time.

According to the apparatus of this embodiment, the time in the acceleration sample information is time calibrated by the server, and therefore it can be ensured that different electronic terminals use a same time reference, which facilitates time comparison.

Sixteenth Embodiment

Figure 22:
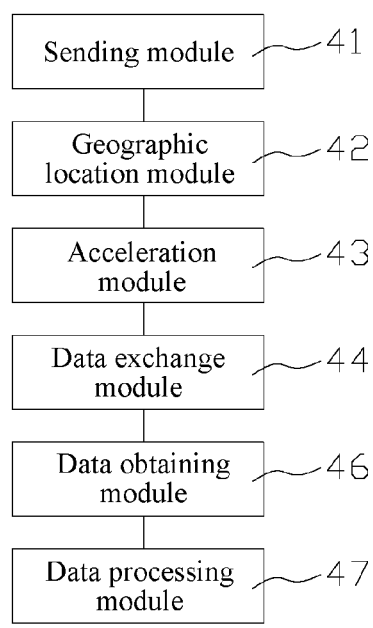
FIG. 22 is a structural block diagram of a data exchange apparatus according to a sixteenth embodiment of the present disclosure.

This embodiment provides a data exchange apparatus, which is used in the server 200 shown in FIG. 1. Referring to FIG. 22, the apparatus of this embodiment is similar to that in FIG. 20, and the difference between them lies in that, the apparatus of this embodiment further includes: a data obtaining module 46 and a data processing module 47.

The data obtaining module 46 is programmed to receive the first to-be-exchanged data sent by the second electronic terminal, or searching for the first to-be-exchanged data through an association according to a second user associated with the second electronic terminal.

The data processing module 47 is programmed to receive a data processing request sent by the first electronic terminal; performing data processing according to the data processing request; and sending a data processing result to the second electronic terminal.

According to the apparatus of this embodiment, in addition to completing data exchange, a data processing operation may be further performed in the server to implement a specific data processing function, so that the user may trigger the data processing function in a very simple manner.

Seventeenth Embodiment

Figure 23:
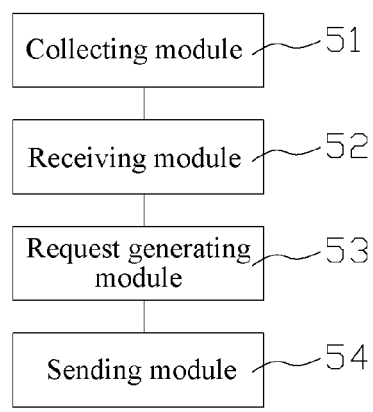
FIG. 23 is a structural block diagram of a data exchange apparatus according to a seventeenth embodiment of the present disclosure.

This embodiment provides a data exchange apparatus, which is used in the first electronic terminal 101 shown in FIG. 1. Referring to FIG. 23, the data exchange apparatus includes: a collecting module 51, a receiving module 52, a request generating module 53, and a sending module 54.

The collecting module 51 is programmed to collect geographic location identification information and acceleration sample information of the first electronic terminal, and sending the collected information to a server, so that the server obtains, according to the geographic location identification information and the acceleration sample information, a second electronic terminal matched with the first electronic terminal.

The receiving module 52 is programmed to receive first to-be-exchanged data returned by the server and associated with the second electronic terminal.

The request generating module 53 is programmed to generate a data processing request according to the first to-be-exchanged data. Specifically, the request generating module 53 is programmed to: output the first to-be-exchanged data; receiving data input by a first user; and generating the data processing request according to the first to-be-exchanged data and the data input by the first user.

The sending module 54 is programmed to send the data processing request to the server, so that the server completes data processing according to the data processing request and sends a processing result to the second electronic terminal.

According to the apparatus of this embodiment, as long as the first electronic terminal 101 and the second electronic terminal 103 are shaken together or touched consecutively, pairing between the first electronic terminal 101 and the second electronic terminal 103 is implemented in the server, without depending on a manner of two-dimensional code or acoustic wave, and a use manner is simple for a user, so that data exchange between different electronic terminals may be efficiently implemented.

Eighteenth Embodiment

Figure 24:
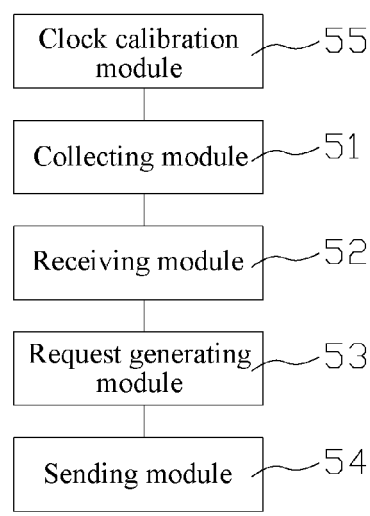
FIG. 24 is a structural block diagram of a data exchange apparatus according to an eighteenth embodiment of the present disclosure.

This embodiment provides a data exchange apparatus, which is used in the first electronic terminal 101 shown in FIG. 1. Referring to FIG. 24, the apparatus of this embodiment is similar to that in FIG. 23, and the difference between them lies in that, the apparatus of this embodiment further includes: a clock calibration module 55, programmed to send a clock synchronization request to the server; and calibrating a clock according to server time returned by the server.

According to the apparatus of this embodiment, the time in the acceleration sample information is time calibrated by the server, and therefore it can be ensured that different electronic terminals use a same time reference, which facilitates time comparison.

Moreover, an embodiment of the present disclosure further provides a computer readable storage medium, which stores a computer executable instruction, and the computer readable storage medium is, for example, a non-volatile memory such as an optical disc, a hard disk or a flash memory. The computer executable instruction is programmed to enable a computer or a similar computing apparatus to complete the user pairing method and the data exchange method.

The descriptions are merely exemplary embodiments of the present disclosure, but are not intended to limit the present disclosure. Although the present disclosure is disclosed with reference to exemplary embodiments above, the exemplary embodiments are not intended to limit the present disclosure. The functions, characteristics, methods described in the different embodiments may be combined to achieve goals consistent with the disclosure. Any person skilled in the art definitely may make some alterations or modifications to obtain equivalent embodiments with equivalent changes without departing from the scope of the technical solutions of the present disclosure by using the disclosed technical content. However, any brief amendments, equivalent changes, and modifications made to the above embodiment according to the technical essence of the present disclosure without departing from the content of the technical solutions of the present disclosure should still fall within the scope of the technical solutions of the present disclosure.

What is claimed is:

1. A user pairing method, comprising:
   receiving a clock synchronization request from a first electronic terminal associated with a first user and a second electronic terminal associated with a second user and returning a server time to the first electronic terminal and second electronic terminal for clock calibration and synchronization;
   receiving geographic location identification information and acceleration sample information sent by the first electronic terminal and the second electronic terminal, wherein the acceleration sample information comprises at least one sample that comprises an acceleration value and time corresponding to the acceleration value; wherein the time is obtained after the clock calibration and synchronization by the first electronic terminal and the second electronic terminal;
   determining, according to the geographic location identification information, whether a first geographic location of the first electronic terminal and a second geographic location of the second electronic terminal satisfy a predetermined distance condition, indicating that the first electronic terminal and the second electronic terminal are co-located;
   determining, according to the acceleration value and the time corresponding to the acceleration value, whether the acceleration sample information of the first electronic terminal and the acceleration sample information of the second electronic terminal are matched in time indicating that the first electronic terminal and the second electronic terminal simultaneously undergo a same motion, wherein the acceleration sample information of the first electronic terminal and the acceleration sample information of the second electronic terminal are determined as matched in time when the acceleration sample information of each of the first electronic terminal and the second electronic terminal comprises at least two acceleration value inflection points with a same time, and a time intervals between the at least two acceleration value inflection points are the same; and
   when the first and second geographic locations satisfy the predetermined distance condition and the acceleration sample information of the first electronic terminal and the acceleration sample information of the second electronic terminal are matched in time, recording a pairing relationship between the first user and the second user which are associated with the first electronic terminal and the second electronic terminal respectively.

2. The user pairing method according to claim 1, wherein determining, according to the acceleration value and the time corresponding to the acceleration value, whether the acceleration sample information of the first electronic terminal and the acceleration sample information of the second electronic terminal are matched in time further comprises:
   calculating a similarity between the acceleration value of the first electronic terminal and the acceleration value of the second electronic terminal; and
   determining that the acceleration sample information of the first electronic terminal and the acceleration sample information of the second electronic terminal are matched in time when the similarity exceeds a predetermined threshold and when the acceleration sample information of each of the first electronic terminal and the second electronic terminal comprises at least two acceleration value inflection points with a same time, and a time intervals between the at least two acceleration value inflection points are the same.

3. A data exchange method, comprising:
- receiving, by a server comprising a processor, a clock synchronization request from a first electronic terminal associated with a first user and a second electronic terminal associated with a second user and returning a server time to the first electronic terminal and second electronic terminal for clock calibration and synchronization;
- receiving, by the server, geographic location identification information and acceleration sample information sent by the first electronic terminal and the second electronic terminal, wherein the acceleration sample information comprises at least one sample that comprises an acceleration value and time corresponding to the acceleration value; wherein the time is obtained after the clock calibration and synchronization by the first electronic terminal and the second electronic terminal;
- determining, by the server according to the geographic location identification information, whether a first geographic location of the first electronic terminal and a second geographic location of the second electronic terminal satisfy a predetermined distance condition, indicating that the first electronic terminal and the second electronic terminal are co-located;
- determining, by the server according to the acceleration value and the time corresponding to the acceleration value, whether the acceleration sample information of the first electronic terminal and the acceleration sample information of the second electronic terminal are matched in time indicating that the first electronic terminal and the second electronic terminal simultaneously undergo a same motion, wherein the acceleration sample information of the first electronic terminal and the acceleration sample information of the second electronic terminal are determined as matched in time when the acceleration sample information of each of the first electronic terminal and the second electronic terminal comprises at least two acceleration value inflection points with a same time, and a time intervals between the at least two acceleration value inflection points are the same; and
- when the first and second geographic locations satisfy the predetermined distance condition and the acceleration sample information of the first electronic terminal and the acceleration sample information of the second electronic terminal are matched in time, initiating an exchange of data between the first electronic terminal and the second electronic terminal.

4. The data exchange method according to claim 3, further comprising:
- receiving a data processing request sent by the first electronic terminal;
- performing data processing according to the data processing request; and
- sending a data processing result to the second electronic terminal.

5. The data exchange method according to claim 3, further comprising at least one of the following:
- receiving first to-be-exchanged data sent by the second electronic terminal; and
- searching for the first to-be-exchanged data through an association according to a second user associated with the second electronic terminal.

6. The data exchange method according to claim 3, wherein determining, according to the acceleration value and the time corresponding to the acceleration value, whether the acceleration sample information of the first electronic terminal and the acceleration sample information of the second electronic terminal are matched in time further comprises:
- calculating a similarity between the acceleration value of the first electronic terminal and the acceleration value of the second electronic terminal; and
- determining that the acceleration sample information of the first electronic terminal and the acceleration sample information of the second electronic terminal are matched in time when the similarity exceeds a predetermined threshold and when the acceleration sample information of each of the first electronic terminal and the second electronic terminal comprises at least two acceleration value inflection points with a same time, and a time intervals between the at least two acceleration value inflection points are the same.

7. A data exchange method between electronic terminals, applied to a first electronic terminal associated with a first user, wherein the method comprises:
- sending a clock synchronization request from the first electronic terminal and a second electronic terminal associated with a second user and returning a server time to the first electronic terminal and second electronic terminal for clock calibration and synchronization;
- collecting geographic location identification information and acceleration sample information of the first electronic terminal, and sending the collected geographic location identification and acceleration sample information and time associated with the acceleration sample to a server, wherein the time is obtained after the clock calibration and synchronization by the first electronic terminal and the second electronic terminal, so that the server obtains, according to the geographic location identification information and the acceleration sample information, the second electronic terminal and the first electronic terminal satisfy a distance condition at a same time indicating that the first electronic terminal and the second electronic terminal are co-located, and are matched in acceleration in time indicating that the first electronic terminal and the second electronic terminal simultaneously undergo a same motion, wherein the acceleration sample information of the first electronic terminal and the acceleration sample information of the second electronic terminal are determined by the server as matched in time when the acceleration sample information of each of the first electronic terminal and the second electronic terminal comprises at least two acceleration value inflection points with a same time, and a time intervals between the at least two acceleration value inflection points are the same;
- receiving first to-be-exchanged data returned by the server and associated with the second electronic terminal;
- generating a data processing request according to the first to-be-exchanged data; and
- sending the data processing request to the server, so that the server completes data processing according to the data processing request and sends a processing result to the second electronic terminal.

8. The data exchange method according to claim 7, wherein the generating a data processing request according to the first to-be-exchanged data comprises: outputting the first to-be-exchanged data; receiving data input by a first user; and generating the data processing request according to the first to-be-exchanged data and the data input by the first user.

9. A user pairing apparatus, comprising a processor and a memory accessible to the processor, the processor is configured to execute instructions in the memory to:

receive a clock synchronization request from a first electronic terminal associated with a first user and a second electronic terminal associated with a second user and returning a server time to the first electronic terminal and second electronic terminal for clock calibration and synchronization:

receive geographic location identification information and acceleration sample information sent by the first electronic terminal and the second electronic terminal, wherein the acceleration sample information comprises at least one sample, and each sample comprises time and an acceleration value an acceleration value and time corresponding to the acceleration value; wherein the time is obtained after the clock calibration and synchronization by the first electronic terminal and the second electronic terminal;

determine, according to the geographic location identification information, whether a first geographic location of the first electronic terminal and a second geographic location of the second electronic terminal satisfy a predetermined distance condition, indicating that the first electronic terminal and the second electronic terminal are co-located;

determine, according to the time and the acceleration value, whether the acceleration sample information of the first electronic terminal and the acceleration sample information of the second electronic terminal are matched in time indicating that the first electronic terminal and the second electronic terminal simultaneously undergo a same motion, wherein the acceleration sample information of the first electronic terminal and the acceleration sample information of the second electronic terminal are determined as matched in time when the acceleration sample information of each of the first electronic terminal and the second electronic terminal comprises at least two acceleration value inflection points with a same time, and a time intervals between the at least two acceleration value inflection points are the same; and when the first and second geographic locations satisfy the predetermined distance condition and the acceleration sample information of the first electronic terminal and the acceleration sample information of the second electronic terminal are matched in time, record a pairing relationship between the first user and the second user which are associated with the first electronic terminal and the second electronic terminal respectively.

10. The user pairing apparatus according to claim 9, wherein the processor, when executing the instructions in the memory, is further configured to:

calculate a similarity between the acceleration value of the first electronic terminal and the acceleration value of the second electronic terminal; and determine that the acceleration sample information of the first electronic terminal and the acceleration sample information of the second electronic terminal are matched in time when the similarity exceeds a predetermined threshold and when the acceleration sample information of each of the first electronic terminal and the second electronic terminal comprises at least two acceleration value inflection points with a same time, and a time intervals between the at least two acceleration value inflection points are the same.

* * * * *